US009722861B2

(12) United States Patent
Bejerano et al.

(10) Patent No.: US 9,722,861 B2
(45) Date of Patent: Aug. 1, 2017

(54) FAULT-RESILIENT BROADCAST, MULTICAST, AND UNICAST SERVICES

(71) Applicants: Yigal Bejerano, Springfield, NJ (US); Pramod V. Koppol, Manalapan, NJ (US)

(72) Inventors: Yigal Bejerano, Springfield, NJ (US); Pramod V. Koppol, Manalapan, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 442 days.

(21) Appl. No.: 14/143,120

(22) Filed: Dec. 30, 2013

(65) Prior Publication Data

US 2015/0009807 A1 Jan. 8, 2015

Related U.S. Application Data

(60) Provisional application No. 61/843,401, filed on Jul. 7, 2013.

(51) Int. Cl.
*H04L 12/28* (2006.01)
*H04L 12/24* (2006.01)

(52) U.S. Cl.
CPC ...... *H04L 41/0659* (2013.01); *H04L 41/0663* (2013.01); *H04L 41/0668* (2013.01); *H04L 41/12* (2013.01)

(58) Field of Classification Search
CPC .................................................. H04L 41/0654
USPC ......................................................... 370/221
See application file for complete search history.

(56) References Cited

U.S. PATENT DOCUMENTS

| | | | | |
|---|---|---|---|---|
| 7,835,301 B1 * | 11/2010 | Maufer | H04W 24/02 370/254 |
| 2007/0237097 A1 * | 10/2007 | Maharana | H04L 12/462 370/255 |
| 2013/0155962 A1 * | 6/2013 | Hakola | H04W 72/042 370/329 |

OTHER PUBLICATIONS

Bejerano, Y. et al., "Link-Coloring Based Scheme for Multicast and Unicast Protection," High Performance Switching and Routing (HPSR), Jul. 8-11, 2013, IEEE 14th International Conference, pp. 8.

* cited by examiner

*Primary Examiner* — Wei Zhao
(74) *Attorney, Agent, or Firm* — Tong, Rea, Bentley & Kim, LLC

(57) ABSTRACT

In general, various capabilities related to fault-resilient services within communication networks are presented. The services may include broadcast services, multicast services, unicast services, or the like, as well as various combinations thereof. A capability for providing local protection to unicast traffic at a node associated with a pair of redundant trees is presented herein. A capability for providing local protection to multicast traffic at a node associated with a pair of redundant trees is presented herein. A capability for constructing a pair of redundant trees is presented herein. A capability for constructing a pair of redundant trees includes partitioning a graph into a pair of partitions based on a link coloring mechanism and constructing the pair of redundant trees based on the pair of partitions.

24 Claims, 18 Drawing Sheets

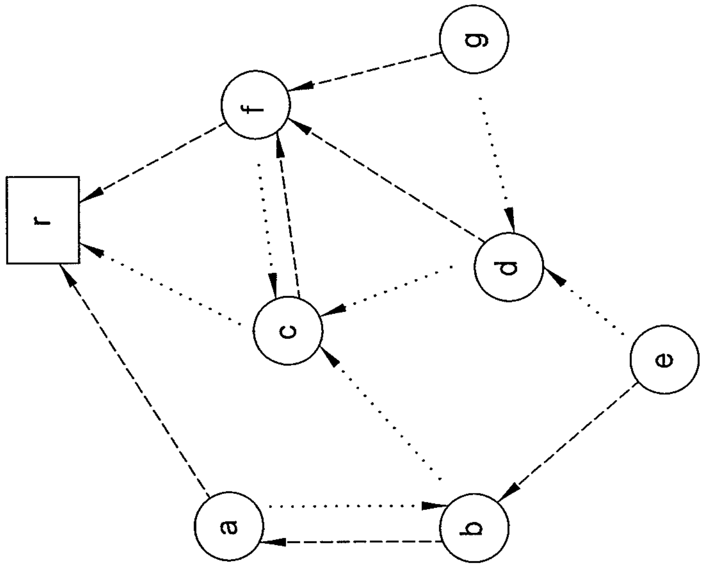
FIG. 2A
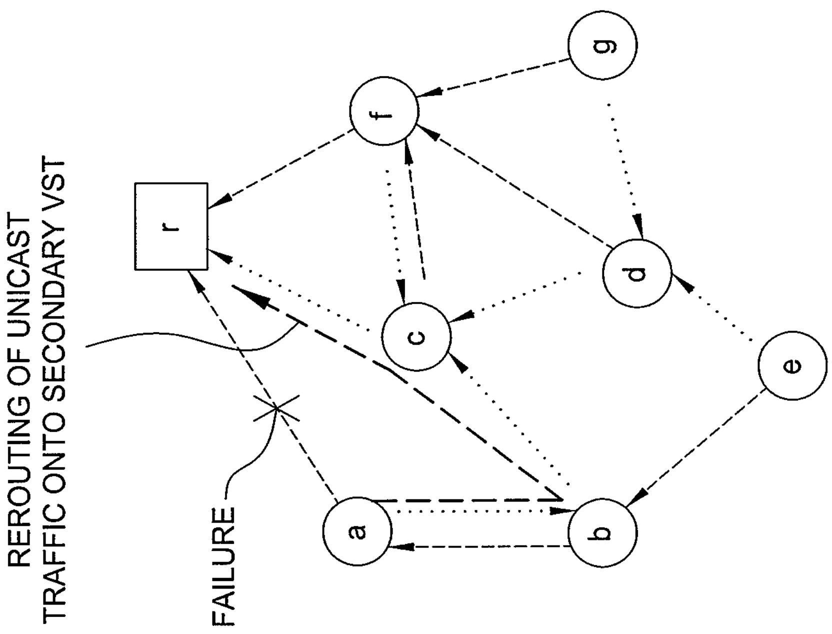
FIG. 2B
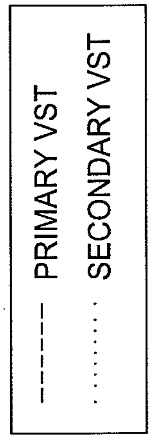

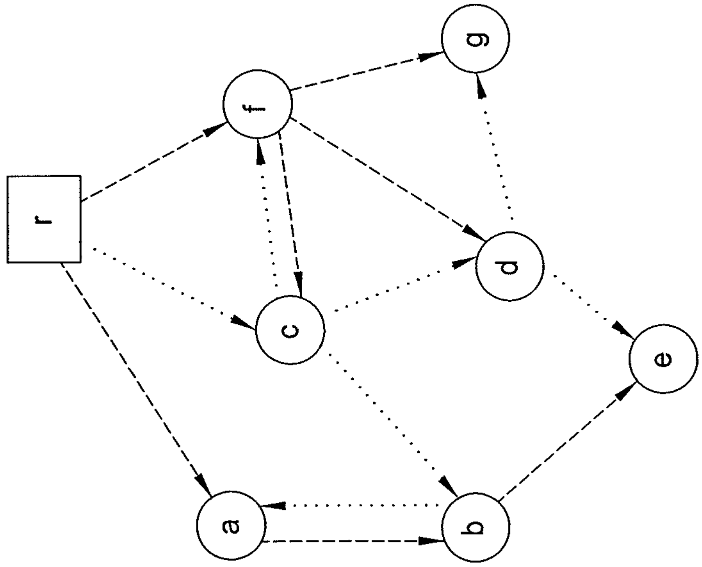
FIG. 4A
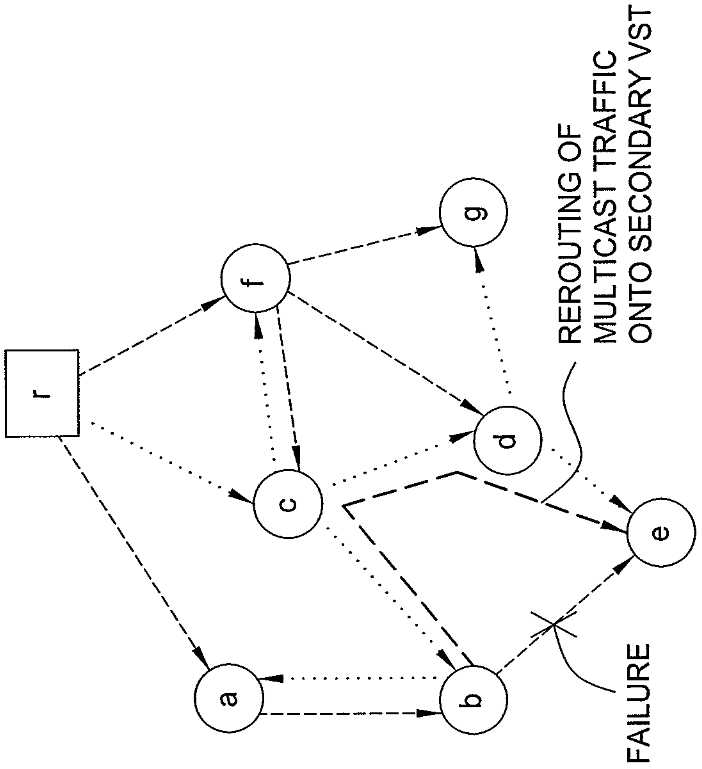
FIG. 4B
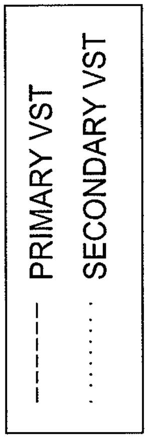

FAULT-RESILIENT BROADCAST, MULTICAST, AND UNICAST SERVICES

CROSS-REFERENCE TO RELATED APPLICATIONS

This application claims the benefit of U.S. Provisional Patent Application Ser. No. 61/843,401, entitled "FAULT-RESILIENT BROADCAST, MULTICAST, AND UNICAST SERVICES," filed Jul. 7, 2013, which is hereby incorporated herein by reference in its entirety.

TECHNICAL FIELD

The disclosure relates generally to communication networks and, more specifically but not exclusively, to providing fault-resilient services within communication networks.

BACKGROUND

The use of fault resiliency in communication networks continues to grow. Fault resiliency may be used in various types of communication networks. Fault resiliency may be provided for broadcast services, multicast services, and unicast services.

SUMMARY OF EMBODIMENTS

Various deficiencies in the prior art are addressed by embodiments for related to providing fault resiliency in communication networks.

In at least some embodiments, an apparatus includes a processor and a memory communicatively connected to the processor. The processor is configured to receive a graph representing a topology of at least a portion of a network, where the graph includes a set of nodes and a set of links and the set of nodes includes a multicast source node. The processor is configured to partition the graph into a pair of partitions including a first partition and a second partition, where the first partition includes each of the nodes of the set of nodes and a first subset of links of the set of links and the second partition includes each of the nodes of the set of nodes and a second subset of links of the set of links. The processor is configured to construct, based on the pair of partitions, a pair of point-to-multipoint (P2MP) trees including a first P2MP tree and a second P2MP tree, where the first P2MP tree is constructed based on the first partition and the second P2MP tree is constructed based on the second partition.

In at least some embodiments, a computer-readable storage medium stores instructions which, when executed by a computer, cause the computer to perform steps of a method. The method includes receiving a graph representing a topology of at least a portion of a network, where the graph includes a set of nodes and a set of links and the set of nodes includes a multicast source node. The method further includes partitioning the graph into a pair of partitions including a first partition and a second partition, where the first partition includes each of the nodes of the set of nodes and a first subset of links of the set of links and the second partition includes each of the nodes of the set of nodes and a second subset of links of the set of links. The method further includes constructing, based on the pair of partitions, a pair of P2MP trees including a first P2MP tree and a second P2MP tree, where the first P2MP tree is constructed based on the first partition and the second P2MP tree is constructed based on the second partition.

In at least some embodiments, a method includes using a processor and a memory to perform a set of steps. The method includes receiving a graph representing a topology of at least a portion of a network, where the graph includes a set of nodes and a set of links and the set of nodes includes a multicast source node. The method further includes partitioning the graph into a pair of partitions including a first partition and a second partition, where the first partition includes each of the nodes of the set of nodes and a first subset of links of the set of links and the second partition includes each of the nodes of the set of nodes and a second subset of links of the set of links. The method further includes constructing, based on the pair of partitions, a pair of P2MP trees including a first P2MP tree and a second P2MP tree, where the first P2MP tree is constructed based on the first partition and the second P2MP tree is constructed based on the second partition.

In at least some embodiments, an apparatus includes a processor and a memory communicatively connected to the processor. The processor is configured to receive a packet via a first redundant tree (RT) rooted at a source node and configured to serve a set of destination nodes, where the first RT has a first tree identifier associated therewith and the packet includes the first tree identifier of the first RT. The processor is configured to, based on detection of a failure on the first RT, modify the packet by replacing the first tree identifier with a second tree identifier of a second RT rooted at the source node and configured to serve the set of destination nodes. The processor is configured to propagate the modified packet via the second RT.

In at least some embodiments, a computer-readable storage medium stores instructions which, when executed by a computer, cause the computer to perform steps of a method. The method includes receiving a packet via a first RT rooted at a source node and configured to serve a set of destination nodes, where the first RT has a first tree identifier associated therewith and the packet includes the first tree identifier of the first RT. The method further includes, based on detection of a failure on the first RT, modifying the packet by replacing the first tree identifier with a second tree identifier of a second RT rooted at the source node and configured to serve the set of destination nodes. The method further includes propagating the modified packet via the second RT.

In at least some embodiments, a method includes using a processor and a memory to perform a set of steps. The method includes receiving a packet via a first RT rooted at a source node and configured to serve a set of destination nodes, where the first RT has a first tree identifier associated therewith and the packet includes the first tree identifier of the first RT. The method further includes, based on detection of a failure on the first RT, modifying the packet by replacing the first tree identifier with a second tree identifier of a second RT rooted at the source node and configured to serve the set of destination nodes. The method further includes propagating the modified packet via the second RT.

BRIEF DESCRIPTION OF THE DRAWINGS

The teachings herein can be readily understood by considering the following detailed description in conjunction with the accompanying drawings, in which:

FIGS. 2A and 2B depict the exemplary communication network of FIG. 1, illustrating use of the pair of RTs to support unicast services (in FIG. 2A) and local protection of unicast services (in FIG. 2B);

FIGS. 4A and 4B depict the exemplary communication network of FIG. 1, illustrating use of the pair of RTs to support multicast services (in FIG. 4A) and local protection of multicast services (in FIG. 4B);

To facilitate understanding, identical reference numerals have been used, where possible, to designate identical elements common to the figures.

DETAILED DESCRIPTION OF EMBODIMENTS

In general, various capabilities for providing fault-resilient services within communication networks are presented. The fault-resilient services may include broadcast services, multicast services, unicast services, or the like, as well as various combinations thereof. In at least some embodiments, a fault-resiliency capability supports local protection for communication services using redundant trees (RTs), such as local protection for unicast services, local protection for multicast services, or the like, as well as various combinations thereof. In at least some embodiments, a link-coloring capability supports establishment of RTs, such as RTs which may be used to support various types of communication services (e.g., unicast services, multicast services, broadcast services, or the like, as well as various combinations thereof). Various embodiments of such capabilities for providing fault-resilient services may be better understood when considered within the context of an exemplary communication networks, such as the exemplary communication network depicted in FIG. 1.

Figure 1:
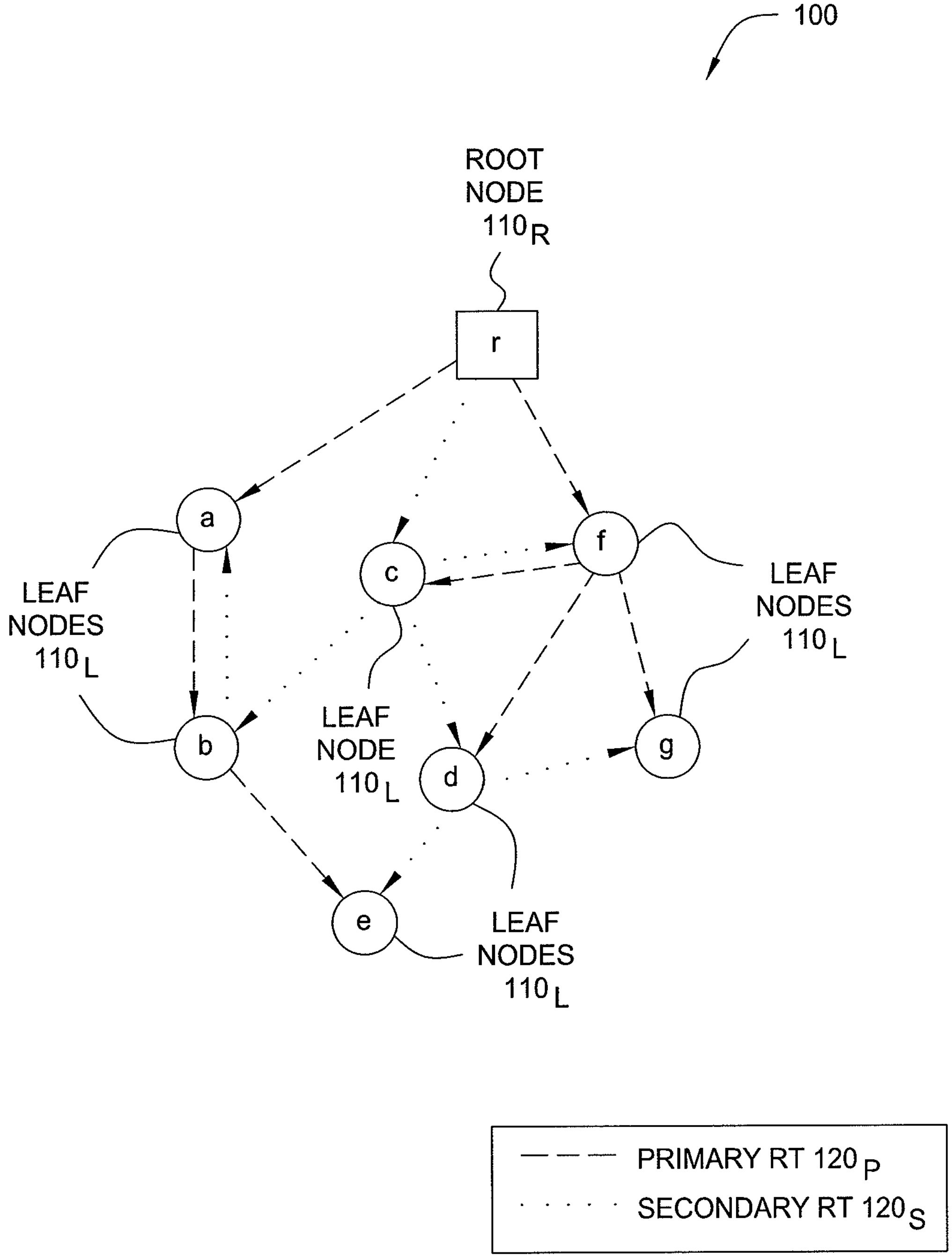
FIG. 1 depicts an exemplary communication network including a pair of redundant trees (RTs)

FIG. 1 depicts an exemplary communication network including a pair of redundant trees (RTs).

The communication network 100 includes a set of nodes 110, including a root node $\mathbf{110}_R$ (denoted as r) and seven leaf nodes $\mathbf{110}_L$ (denoted as a, b, c, d, e, f, and g). The nodes 110 are configured for transmitting and receiving traffic via communication paths. It is noted that the underlying communication links between the nodes 110 are omitted from FIG. 1 for purposes of clarity. The nodes 100 may include any suitable types of nodes (e.g., switches, servers, end user terminals, or the like, as well as various combinations thereof), which may depend on the network type of communication network 100. It is noted that node r is referred to as a "root node" and the remaining nodes are referred to as "leaf nodes" based on the fact that root node $\mathbf{110}_R$ may distribute multicast or broadcast traffic to each of the leaf nodes $\mathbf{110}_L$ using the RTs (i.e., root node $\mathbf{110}_R$ operates as a source of this traffic and the leaf nodes $\mathbf{110}_L$ each operate as sinks of this traffic); however, despite use of these terms, leaf nodes $\mathbf{110}_L$ each may be configured to operate as sources of unicast traffic directed to root node $\mathbf{110}_R$.

The communication network 100 is configured such that the nodes 110 support a pair of RTs 120. The pair of RTs 120 is configured such that each node 110 is associated with two redundant trees (illustratively, a primary RT $\mathbf{120}_P$ which is denoted by solid lines and a secondary RT $\mathbf{120}_S$ which is denoted by dashed lines) that induce two node-disjoint paths from root node $\mathbf{110}_R$ to each leaf node $\mathbf{110}_L$. The pair of RTs 120 is configured such that, under any single failure scenario, each node 110 has reachability on at least one of the RTs 120. The pair of RTs 120 may be computed based on any suitable process for calculating a pair of RTs within a communication network. For example, the pair of RTs 120 may be computed based on one or more of the paper "Redundant Trees for Preplanned Recovery in Arbitrary Vertex-Redundant or Edge-Redundant Graphs" (by Medard et al., published in IEEE/ACM TRANSACTIONS ON NETWORKING), the paper entitled "Link-Coloring Based Scheme for Multicast and Unicast Protection" (by Bejerano et al., published in Bell-Labs™ ITD-10-49734J), embodiments of the link-coloring capability depicted and described herein with respect to FIGS. 6-17, or the like, as well as various combinations thereof. The RTs 120 may be used by root node $\mathbf{110}_R$ to distribute broadcast or multicast traffic to the leaf nodes $\mathbf{110}_L$ and the RTs 120 may be used by each of the leaf nodes $\mathbf{110}_L$ to provide unicast traffic to the root node $\mathbf{110}_R$. It will be appreciated that the pair of RTs 120 also may be referred to as a pair of protected Point-to-Multipoint (P2MP) trees. It will be appreciated that, although primarily depicted and described with respect to embodiments in which the pair of RTs is rooted at a single node (illustratively, root node $\mathbf{110}_R$), the pair of RTs also may be rooted at two different root nodes.

The communication network 100 may include any suitable type of communication network in which RTs may be used for transport of traffic. For example, communication network 100 may be a datacenter network in which root node r is a physical or virtual server and the leaf nodes are physical or virtual clients. For example, communication network 100 may be a content distribution network in which root node r is a content and the leaf nodes are end user devices which may request content from the content server. The communication network 100 may be any other suitable type of communication network in which RTs may be used for transport of traffic. However, for purposes of clarity in describing various embodiments of the fault-resiliency capability, it is assumed that communication network 100 is an Ethernet-based network (e.g., a datacenter network using Ethernet) in which the pair of RTs is implemented as a pair of Virtual Local Area Network (VLAN) spanning trees (VSTs) having different VST Identifiers (VIDs).

FIGS. 2A and 2B depict the exemplary communication network of FIG. 1, illustrating use of the pair of RTs to support unicast services (in FIG. 2A) and local protection of unicast services (in FIG. 2B).

As depicted in FIG. 2A, the communication network 100 of FIG. 1 may be configured to support end-to-end fault resilient unicast services. This enables end-to-end delivery of unicast traffic from leaf nodes to root node r, which is the intended destination of the unicast traffic (and, thus, may be referred to as a destination node or a unicast sink node). The root node r has two VSTs rooted thereat: a primary VST having a first VID and a secondary VST having a second VID. The VSTs of the root node r are used as sink trees for unicast traffic directed to root node r. The root node r sends keep-alive messages on both of the VSTs, thereby enabling the Ethernet switches to learn the outgoing port to the root node r and informing the leaf nodes that they are connected to the root node r on both of the VSTs or only on one of the VSTs. The keep-alive messages may be sent on any suitable time scale (e.g., once each second, approximately every 10-20 ms, or the like) in order to support fast detection of and recovery from failures. The leaf nodes may send unicast traffic to root node r using one of the VSTs. For example, a leaf node may initially send unicast traffic to root node r on the primary VST rooted at root node r (based on the primary VID of the primary VST and the MAC address of the root node r) and then send unicast traffic to root node r on the secondary VST rooted at root node r (based on the second VID of the secondary VST and the MAC address of the root node r) responsive to a failure associated with the primary VST (a failure preventing propagation of the unicast traffic via the primary VST).

As depicted in FIG. 2B, the communication network 100 of FIG. 1 may be configured to provide local protection to unicast services. This enables local protection for unicast traffic that is transmitted from leaf nodes to root node r, which is the intended destination of the unicast traffic (and, thus, may be referred to as a destination node or a unicast sink node). The root node r has two VSTs rooted thereat: a primary VST having a first VID and a secondary VST having a second VID. The first and second VIDs of the primary and secondary VSTs may be the same with the exception of a set of bit positions (e.g., one or more corresponding bit positions of the VIDs). In at least some embodiments, the first and second VIDs of the primary and secondary VSTs are the same with the exception of a single bit (e.g., the least significant bit (LSB) or any other suitable bit position), such that switching between the VSTs may be performed by changing the value of the single bit that is different for the primary and secondary VSTs. The VSTs of the root node r may be used as sink trees for unicast traffic directed to root node r. The root node r sends keep-alive messages on both of the VSTs, thereby enabling the Ethernet switches to learn the outgoing port to the root node r and informing the leaf nodes that they are connected to the root node r on both of the VSTs or only on one of the VSTs. The keep-alive messages may be sent on any suitable time scale (e.g., once each second, approximately every 10-20 ms, or the like) in order to support fast detection of and recovery from failures. The leaf nodes send unicast traffic to root node r using one of the VSTs. The local protection to unicast services may be provided at any of the nodes along the path between the leaf node transmitting the unicast traffic and the root node r. The local protection to unicast services may be provided at a node as follows: the node receives unicast traffic on the primary VST and propagates the unicast traffic toward root node r via the primary VST based on the VID of the primary VST, the node detects a failure on the primary VST in the direction toward the root node r, and the node redirects unicast traffic received on the primary VST to the secondary VST for propagation of the unicast traffic toward root node r via the secondary VST based on the VID of the secondary VST. The node may redirect unicast traffic received on the primary VST to the secondary VST by modifying each packet received on the primary VST and intended for root node r to change the VID of the unicast packet from the VID of the primary VST to the VID of the secondary VST (which, as noted above, may be provided by merely changing a single bit where the first and second VIDs of the primary and secondary VSTs differ by that single bit) and providing the modified packet back to the switching fabric of the node such that the switching fabric of the node sends the modified packet via the secondary VST. It is noted that, if the node detects that the failure condition has been cleared, the node may keep the unicast traffic on the secondary VST (e.g., by continuing to modify received packets) or may redirect the unicast traffic back onto the primary VST (e.g., by preventing the node from modifying each packet received on the primary VST and intended for root node r to change the VID of the unicast packet from the VID of the primary VST to the VID of the secondary VST). An example is depicted in FIG. 2B. In the example of FIG. 2B, (1) node e is operating as a source of unicast traffic intended for root node r and sends unicast packets intended for root node r via the primary VST rooted at root node r, (2) node a is along the path of the primary VST from source node e to root node r and, thus, upon receiving the unicast packets on the primary VST that are intended for root node r, propagates the unicast packets toward root node r via the primary VST, (3) node a detects a failure of the link (a,r) between node a and root node r (indicated by the "X" on this link in FIG. 2B), and (4) for subsequent unicast packets received by node a on the primary VST that are intended for root node r, node a modifies the unicast packets in a manner for directing the unicast packets onto the secondary VST rooted at root node r (e.g., by modifying each unicast packet received on the primary VST and intended for root node r to change the VID of the unicast packet from the VID of the primary VST to the VID of the secondary VST, which may only require modification of a single bit), such that the unicast packets still may be delivered to root node r (illustratively, via the path including nodes b, c, and root node r).

Figure 3:
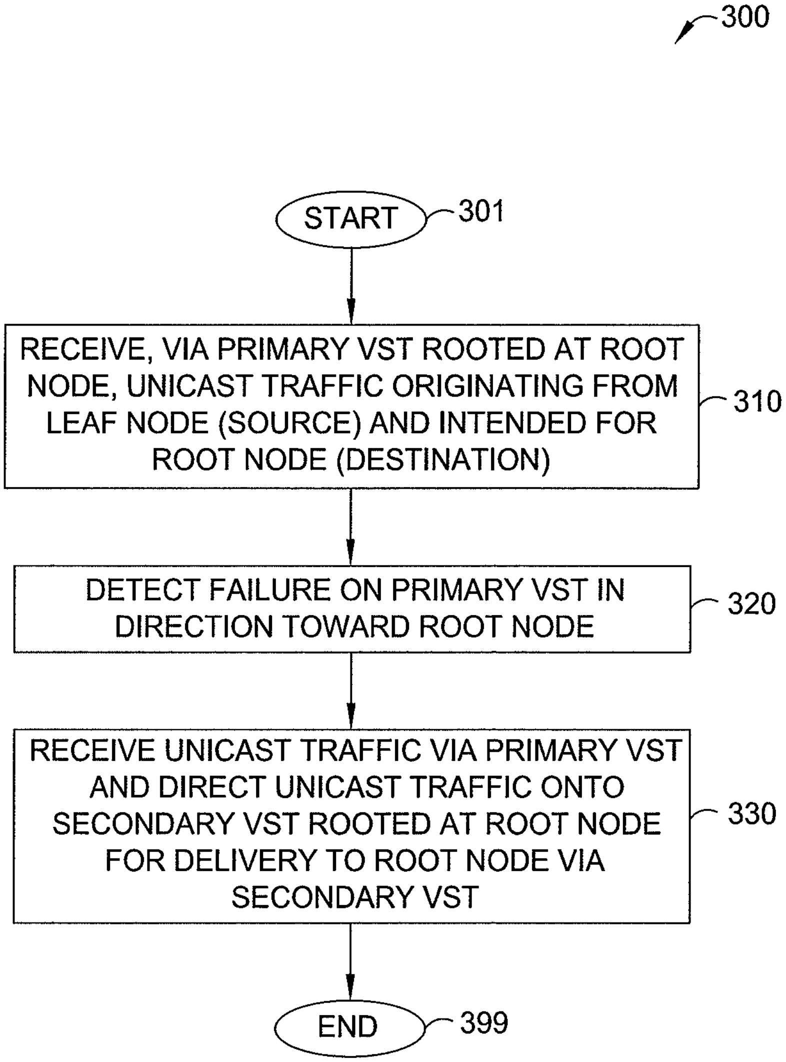
FIG. 3 depicts one embodiment of a method for supporting local protection of unicast services.

FIG. 3 depicts one embodiment of a method for supporting local protection of unicast services. The method 300 for supporting local protection of unicast services is performed by a node having access to primary and secondary VSTs rooted at a root node It will be appreciated that, although primarily depicted and described as being performed serially, at least some of the steps of method 300 may be performed contemporaneously or in a different order than presented in FIG. 3. At step 301, method 300 begins. At step 310, the node receives unicast traffic originating from a leaf node (the source of the unicast traffic) and intended for the root node (the destination of the unicast traffic) and propagates the unicast traffic toward the root node, where the node receives and propagates the unicast traffic via the primary VST rooted at the root node. At step 320, the node detects a failure on the primary VST in the direction from the node toward the root node (e.g., a failure of a link adjacent to the node, a failure of a node adjacent to the node, or the like). At step 330, the node receives unicast traffic via the primary VST rooted at the root node and directs the unicast traffic onto the secondary VST rooted at the root node for propagation toward and delivery to the root node (i.e., unicast traffic received by the node that cannot be delivered to the root node via the primary VST due to the failure is rerouted from the primary VST onto the secondary VST). In at least some embodiments, the node may direct the unicast traffic onto the secondary VST by changing a value of the VID in each of the received unicast packets from a first VID associated with the primary VST to a second VID associated with the secondary VST (which, as discussed herein, may only involve modification of a single bit in at least some embodiments). At step 399, method 300 ends. It will be appreciated that, although depicted as ending (for purposes of clarity), the node performing method 300 may continue to receive unicast traffic via the primary VST and reroute the unicast traffic to the secondary VST for delivery to the root node, may or may not switch the unicast traffic from the secondary VST back to the primary VST when the failure condition clears, or the like, as well as various combinations thereof.

FIGS. 4A and 4B depict the exemplary communication network of FIG. 1, illustrating use of the pair of RTs to support multicast services (in FIG. 4A) and local protection of multicast services (in FIG. 4B).

As depicted in FIG. 4A, the communication network 100 of FIG. 1 may be configured to support end-to-end fault resilient multicast services. This enables end-to-end delivery of multicast traffic from root node r to each of the leaf nodes, which are the intended destinations of the multicast traffic (and, thus, may be referred to as destination nodes or multicast sink nodes). The root node r has two VSTs rooted thereat: a primary VST having a first VID and a secondary VST having a second VID. The VSTs of the root node r are used as source trees for multicast traffic sent by root node r. The multicast traffic sent by root node r includes multicast packets, where each multicast packet is identified by the VID of the VST on which the multicast packet is sent and the multicast MAD address of the multicast group to which the multicast packet is sent. The multicast traffic sent by root node r may be protected using 1:1 protection mode or 1+1 protection mode. In the case of 1:1 protection mode, root node r sends each multicast packet only via the primary VST until a failure is detected, and then sends each multicast packet via both the primary VST and the secondary VST until the failure is resolved. In the case of 1+1 protection mode, root node r sends each multicast packet via both the primary VST and the secondary VST, each leaf node initially selects the primary VST as the source of the multicast packets and accepts packets received via the primary VST, and each leaf node switches from selecting the primary VST as the source of the multicast packets to selecting the secondary VST as the source of the multicast packets in the case of a failure on the primary VST. In the case of 1+1 protection mode, exchange of root-to-leaf information may be used to enable each leaf node to identify the VST to which the leaf node is to listen. It is noted that connectivity fault management and protection switching mechanisms may be based on the IEEE 802.1ag standard.

As depicted in FIG. 4B, the communication network 100 of FIG. 1 may be configured to provide local protection to multicast services. This enables local protection for multicast traffic that is transmitted from root node r to leaf nodes, which are the intended destinations of the multicast traffic (and, thus, may be referred to as destination nodes or multicast sink nodes). The root node r has two VSTs rooted thereat: a primary VST having a first VID and a secondary VST having a second VID. The first and second VIDs of the primary and secondary VSTs may be the same with the exception of a set of bit positions (e.g., one or more corresponding bit positions of the VIDs). In at least some embodiments, the first and second VIDs of the primary and secondary VSTs are the same with the exception of a single bit (e.g., the least significant bit (LSB) or any other suitable bit position), such that switching between the VSTs may be performed by changing the value of the single bit that is different for the primary and secondary VSTs. The VSTs of the root node r may be used as source trees for multicast traffic directed from root node r to the leaf nodes. The local protection to multicast services may be provided at any of the nodes along the paths between the root node r transmitting the multicast traffic and the leaf nodes that are the destinations of the multicast traffic. The local protection of multicast traffic may be provided where the root node r is configured to operate in 1:1 protection mode, in which root node r sends each multicast packet only via the primary VST. The local protection of multicast traffic may be provided at a node as follows: the node receives multicast traffic on the primary VST and propagates the multicast traffic via the primary VST based on the VID of the primary VST, the node detects a failure on the primary VST in the direction away from the root node r and toward one or more leaf nodes, and the node redirects multicast traffic received on the primary VST to the secondary VST for propagation of the multicast traffic toward one or more leaf nodes via the secondary VST based on the VID of the secondary VST. The node may redirect multicast traffic received on the primary VST to the secondary VST by modifying each packet received on the primary VST to change the VID of the multicast packet from the VID of the primary VST to the VID of the secondary VST (which, as noted above, may be provided by merely changing a single bit where the first and second VIDs of the primary and secondary VSTs differ by that single bit) and providing the modified packet back to the switching fabric of the node such that the switching fabric of the node sends the modified packet via the secondary VST. It is noted that, if the node detects that the failure condition has been cleared, the node may keep the multicast traffic on the secondary VST (e.g., by continuing to modify received packets) or may redirect the multicast traffic back onto the primary VST (e.g., by preventing the node from modifying each packet received on the primary VST to change the VID of the multicast packet from the VID of the primary VST to the VID of the secondary VST). An example is depicted in FIG. 4B. In the example of FIG. 4B, (1) root node r is operating as a source of multicast traffic intended for each of the leaf nodes (including leaf node e) and sends multicast packets via the primary VST rooted at root node r using 1:1 protection mode, (2) node b is along the path of the primary VST from root node r to leaf node e and, thus, upon receiving the multicast packets on the primary VST that are intended for leaf node e, propagates the multicast packets toward leaf node e via the primary VST, (3) node b detects a failure of the link (b,e) between node b and leaf node e (indicated by the "X" on this link in FIG. 4B), and (4) for subsequent multicast packets received by node b on the primary VST, node b modifies the multicast packets in a manner for directing the multicast packets onto the secondary VST rooted at root node r (e.g., by modifying each multicast packet received on the primary VST to change the VID of the multicast packet from the VID of the primary VST to the VID of the secondary VST, which may only require modification of a single bit), such that the multicast packets still may be delivered to leaf node e (illustratively, via the path including nodes b, c, d, and leaf node e). It is noted that, if a given multicast packet is routed along both the primary VST and the secondary VST, the multicast packet is not switched back to the primary VST in response to a failure on the secondary VST as this may cause loops for the multicast packet.

Figure 5:
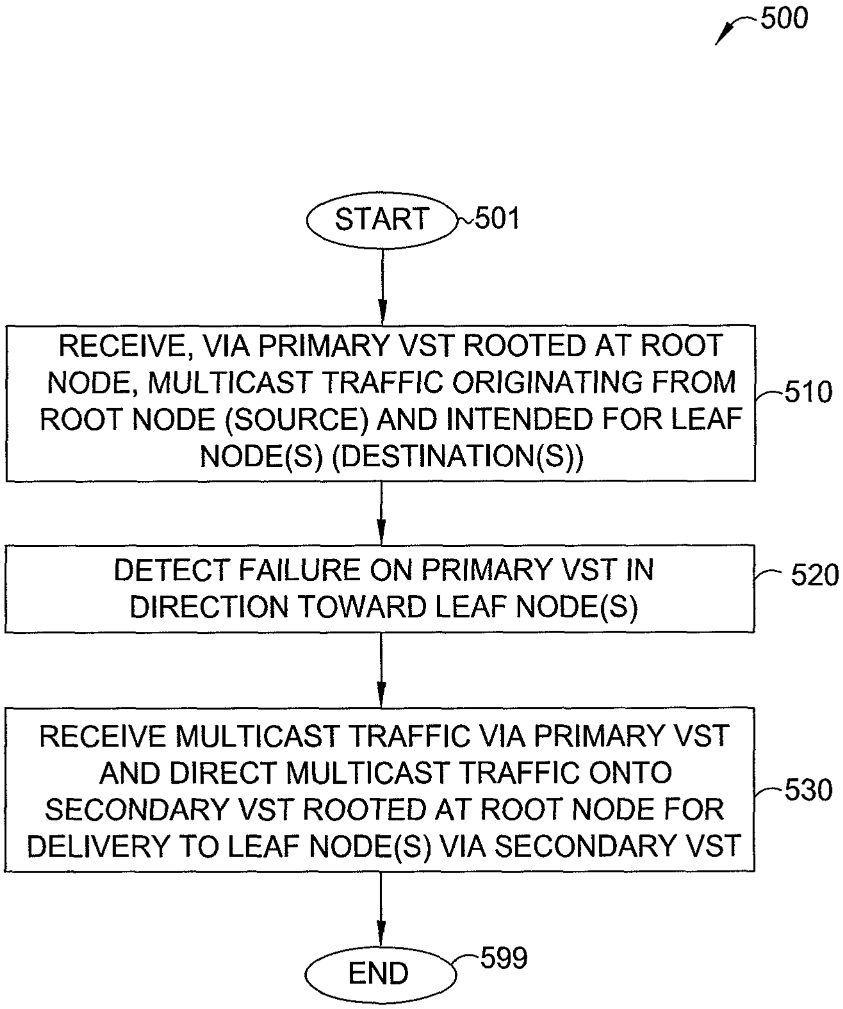
FIG. 5 depicts one embodiment of a method for supporting local protection of multicast services.

FIG. 5 depicts one embodiment of a method for supporting local protection of multicast services. The method 500 for supporting local protection of multicast services is performed by a node having access to primary and secondary VSTs rooted at a root node It will be appreciated that, although primarily depicted and described as being performed serially, at least some of the steps of method 500 may be performed contemporaneously or in a different order than presented in FIG. 5. At step 501, method 500 begins. At step 510, the node receives multicast traffic originating from the root node (the source of the multicast traffic) and intended for a set of leaf nodes (the destinations of the multicast traffic) and propagates the multicast traffic toward one or more leaf nodes in the set of leaf nodes, where the node receives and propagates the multicast traffic via the primary VST rooted at the root node. At step 520, the node detects a failure on the primary VST in the direction from the node toward the one or more leaf nodes (e.g., a failure of a link adjacent to the node, a failure of a node adjacent to the node, or the like). At step 530, the node receives multicast traffic via the primary VST rooted at the root node and directs the multicast traffic onto the secondary VST rooted at the root node for propagation toward the one or more leaf nodes (i.e., multicast traffic received by the node that cannot be delivered via the primary VST due to the failure is rerouted from the primary VST onto the secondary VST). In at least some embodiments, the node may direct the multicast traffic onto the secondary VST by changing a value of the VID in each of the received multicast packets from a first VID associated with the primary VST to a second VID associated with the secondary VST (which, as discussed herein, may only involve modification of a single bit in at least some embodiments). At step 599, method 500 ends. It will be appreciated that, although depicted as ending (for purposes of clarity), the node performing method 500 may continue to receive multicast traffic via the primary VST and reroute the multicast traffic to the secondary VST for propagation toward one or more leaf nodes, may or may not switch the multicast traffic from the secondary VST back to the primary VST when the failure condition clears, or the like, as well as various combinations thereof.

It is noted that, although primarily depicted and described with respect to cases in which local protection of multicast traffic is possible, there may be cases in which local protection of multicast traffic is not possible. For example, a given node will not be able to support local protection of multicast traffic where a failure adjacent to the node (e.g., a failure of an adjacent link or node) is associated with both the primary VST and the secondary VST in opposite directions. An example of this case is node f and adjacent link (c,f) depicted in FIGS. 4A and 4B. The link (c,f) is used by both the primary VST and the second VST in opposite directions. As a result, if link (c,f) fails then node f is unable to use local protection to forward multicast traffic to node c since the secondary VST also is impacted by the failure of link (c,f). In this case, node f, rather than providing local protection for the multicast traffic, signals root node r to send the multicast traffic on both the primary VST and the secondary VST. Thus, more generally, in at least some embodiments in which the 1:1 protection mode is used for multicast traffic, the local node that is unable to provide local protection for received multicast traffic may signal the root node r to use end-to-end protection for the multicast traffic by sending the multicast traffic on both the primary and secondary VSTs. In at least some embodiments, a node, upon detecting the presence of an element supporting primary and second VSTs in the opposite direction, may configure itself to signal the root node r, rather than attempt local restoration, upon detection of a failure of the element supporting primary and second VSTs. In at least some embodiments, a node, upon detecting failure of an element, may determine whether or not the failed element supports primary and second VSTs in the opposite direction, may initiate appropriate restoration action on the basis of the determination as to whether or not the failed element supports primary and second VSTs in the opposite direction (e.g., initiating local restoration via modification of the multicast packets based on a determination that the failed element does not support the primary and second VSTs in the opposite direction or initiating end-to-end restoration (e.g., via signaling to the root node r) based on a determination that the failed element does support the primary and second VSTs in the opposite direction).

It is noted that, although primarily depicted and described herein with respect to embodiments in which the VIDs of the primary and secondary VSTs differ by only a single bit, in at least some embodiments the VIDs of the primary and secondary VSTs may differ by more than a single bit, in which case modification of a packet to switch between the VID of the primary VST and the VID of the secondary VST may require more than changing a single bit (e.g., changing multiple bit positions, removing the VID of the primary VST and replacing it with the VID of the secondary VST, or the like).

As discussed above, in at least some embodiments a link-coloring capability supports establishment of RTs, such as RTs which may be used to support various types of communication services (e.g., unicast services, multicast services, broadcast services, or the like, as well as various combinations thereof). For example, the link-coloring capability (or other link coloring techniques) may be used to determine the VST pairs depicted and described with respect to FIGS. 1-5. Similarly, for example, the link-coloring capability may be used to determine RT-pairs in other contexts.

In at least some embodiments, a computationally-efficient link-coloring procedure facilitates determination of RTs which may be used to provide end-to-end protection for dynamic multicast and unicast connections. In general, a pair of RTs connects the source of a multicast connection to each destination of the multicast connection in such a way that, in the event of a single link or node failure associated with the multicast connection, each destination of the multicast connection is still connected to the source of the multicast connection in at least one of the two trees in the pair of RTs supporting the multicast connection. In at least some embodiments, the link-coloring procedure is configured such that, for a given source node of a multicast connection in a network, links of the network are colored as red or blue such that, for any destination node of the multicast connection, the red and blue paths are guaranteed to be node disjoint (namely, red and blue trees, constructed using only the red and blue links, respectively, will form a pair of RTs independent of the underlying tree selection method). In at least some embodiments, in network topologies in which such a pair of RTs cannot be constructed due to lack of required path diversity, the link-coloring procedure may be configured to construct two multicast trees such that the red and blue paths from the source node of the multicast connection to any destination node of the multicast connection only share cut links or nodes. It is noted that, although finding an optimal pair of RTs is known to be NP-complete, extensive simulations show that various embodiments of the link-coloring procedure calculate near optimal RTs while substantially outperforming various other solutions for computing RT-pairs.

Reliable delivery of network services is dependent on the existence of a resilient network that can rapidly restore services in the event of a failure. Protection and restoration are among the fundamental building blocks in the realization of network resiliency. Such schemes have been extensively studied both in the context of wireline networks and wireless networks. Protection and restoration of multicast connections also have been studied extensively, although to a relatively lesser extent. With the increasing demand for multicast services (e.g., broadcast TV, multi-party video conferencing, content distribution, distance learning classrooms, and the like) there is an increasing need for efficient mechanisms for protection of multicast connections. One of the commonly proposed preplanned multicast recovery solutions is the redundant trees (RTs) approach. In general, given a source node (also referred as a root node), and a set of destinations, RTs based multicast restoration is achieved by constructing two trees rooted at the source node such that the source node remains connected to each of the destinations in the event of a single link or node failure. An RT-pair is considered to be optimal if its total cost is minimal. In general, such trees are called redundant spanning trees if the destinations are all the non-source nodes in the network, otherwise, they are called redundant Steiner trees.

Figure 6A:
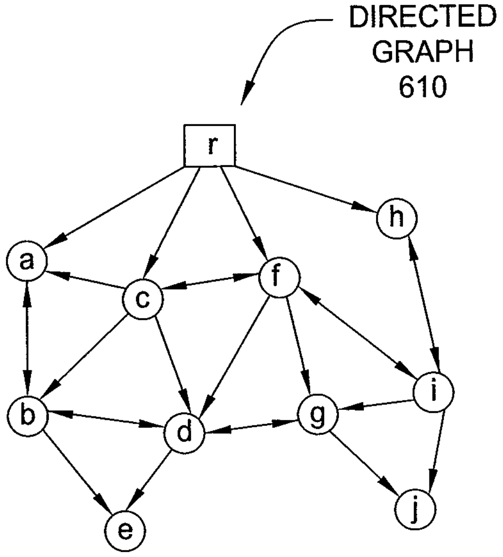
FIGS. 6A-6D depict an exemplary directed graph, use of link coloring to form a pair of partitions for the directed graph, and an RT-pair constructed based on the pair of partitions.
Figure 6B:
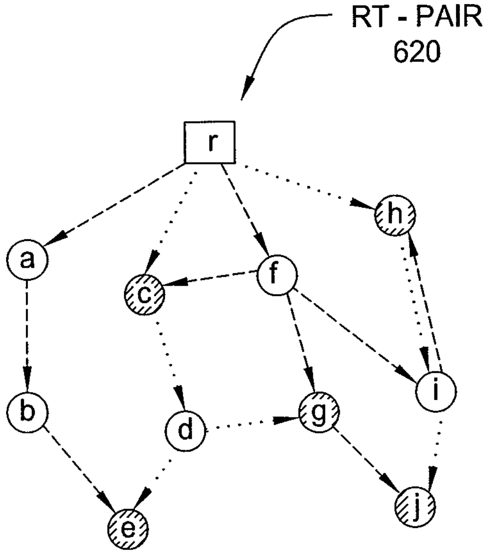
Figure 6C:
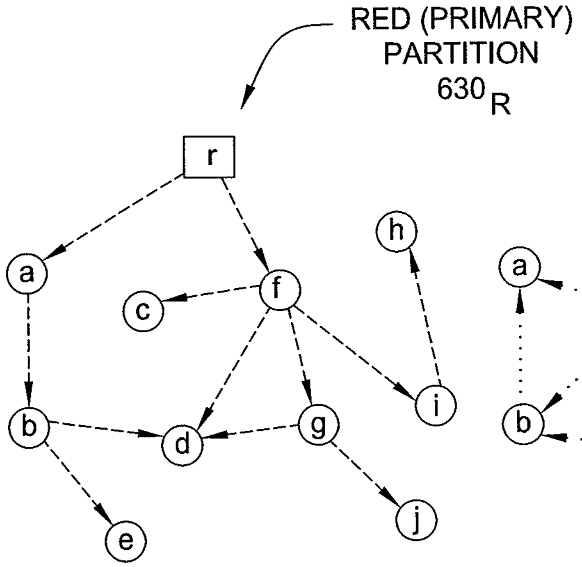
Figure 6D:
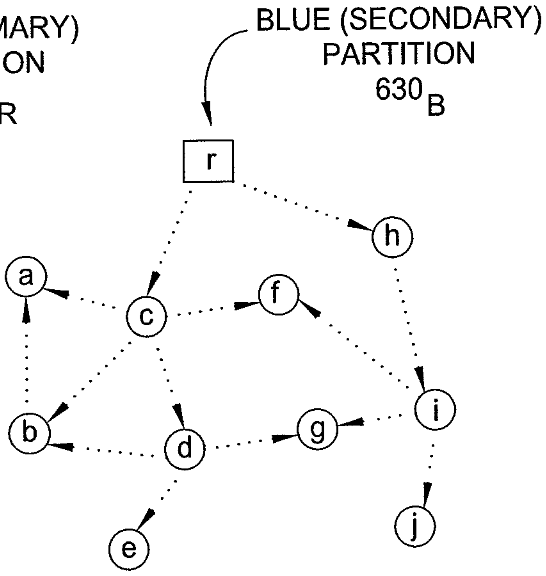

FIGS. 6A-6D depict an exemplary directed graph and use of link coloring to form an RT-pair in the exemplary directed graph. FIG. 6A depicts a directed graph 610 including a root node r and a set of nodes [a, b, c, d, e, f, g, h, l, j]. FIG. 6B depicts an RT-pair 620 of the directed graph 610 for a set of destination nodes D={c, e, g, h, j}, including a first RT (denoted by dashed lines) and a second RT (denoted by dotted lines). FIGS. 6C and 6D depict the red partition $\mathbf{630}_R$ and the blue partition $\mathbf{630}_B$ of the RT-pair 620 depicted in FIG. 6B. It is noted that the first RT of the RT-pair 620 may be constructed from red partition $\mathbf{630}_R$ of FIG. 6C, using any suitable tree construction mechanism, independent of construction of the second RT of the RT-pair 620. Similarly, it is noted that the second RT of the RT-pair 620 may be constructed from blue partition $\mathbf{630}_B$ of FIG. 6D, using any suitable tree construction mechanism, independent of construction of the first RT of the RT-pair 620.

RT-based protection schemes are broadly applicable across many networking technologies for both multicast and unicast services. For multicast services, for example, RT-based schemes have been proposed for Synchronous Optical Network (SONET)/Synchronous Digital Hierarchy (SDH) networks, Multiprotocol Label Switching (MPLS) networks, Wavelength Divisional Multiplexing (WDM) networks, distributed systems, and the like. For unicast traffic, for example, RT-based schemes (e.g., in which the root of an RT-pair typically serves as the destination and each node in the network is connected with two node-disjoint paths to the root of the RT-pair) have been proposed for restoration of IP unicast traffic, wireless sensor networks, or the like.

While various solutions have been proposed for the problem of computing RTs, such solutions have a number of drawbacks. Various integer-linear programming (ILP) based heuristics have been proposed for the problem of finding optimal redundant Steiner trees (which is known to be NP-complete), however, such ILP based heuristics are computationally intensive and may produce a fractional solution that does not specify two RTs. These drawbacks prohibit the use of ILP-based methods for most practical usage. Similarly, various combinatorial algorithms have been proposed for constructing redundant spanning trees without providing any guarantee on the quality of the solution; however, such combinatorial algorithms typically model the network as an undirected graph and may not find RT-pairs for directed graphs at all, even when such solutions exist. Namely, an undirected graph model may not be expressive enough to accommodate practical networks, for instance, where the residual capacities of a link are not the same in both directions, or where a different cost metric is needed for each direction.

In at least some embodiments, a computationally-efficient link-coloring procedure is configured to support computation of near-optimal (low cost) RTs. In at least some embodiments, a computationally-efficient link-coloring procedure is configured to support computation, provisioning, and maintenance of near-optimal (low cost) RTs. In at least some embodiments, a computationally-efficient link-coloring procedure is configured to support computation of near-optimal (low cost) RTs in directed graphs. In at least some embodiments, a computationally-efficient link-coloring procedure is configured to support computation of near-optimal RTs for networks with cut nodes or cut links by partitioning the network in such a way that if some node v does not have two node or edge disjoint paths from the multicast source node, then any paths from the multicast source node to node v on the two RTs share only the necessary cut links/nodes. In at least some embodiments, a computationally-efficient link-coloring procedure is configured to maintain connectivity of RTs in the event of topology changes (e.g., gracefully handling topology changes (including addition of new destinations) without affecting existing RTs (as opposed to procedures using naïve construction of RTs pairs, which may prevent other nodes from joining the multicast connection without affecting the existing RTs)).

In at least some embodiments, a graph-partitioning based procedure is configured for provisioning and maintaining dynamic RTs, where new destination nodes may join without affecting the existing RTs. In at least some embodiments, a graph-partitioning based procedure is configured for, given a graph representing a network topology and a multicast source node, performing link coloring that logically partitions the network into two redundant directed acyclic subgraphs (RDAGs), which are referred to herein as red and blue RDAGs. The RDAGs are constructed in such a manner that, for any given multicast connection request, red and blue trees can be independently provisioned using any tree selection method at each of the two RDAGs and together induce low cost redundant trees. This allows the flexibility of designing dynamic RTs that meet different objectives. For instance, the primary tree may be a shortest path tree for reducing end-to-end delays, while the standby tree may be a Steiner tree for efficient resource utilization. FIGS. 6B-6D illustrate such red and blue RDAGs (namely, red partition $\mathbf{630}_R$ and blue partition $\mathbf{630}_B$ which are used to compute the RTs of form RT-pair 620) for directed graph 610 of FIG. 6A.

In order to describe embodiments of the link-coloring procedure, consider a communication network that supports multicast and unicast connections with a source node r. The network is modeled as a directed graph G(V,E), where each node v∈V is a network element (e.g., router, switch, or the like) and the set of edges E includes the set of directed links between the nodes. A link from node u to node v is denoted by a directed edge (u,v)∈E, where node u is called an "incoming neighbor" of node v and node v is called an "outgoing neighbor" of node u. In this network model, each directed edge e=(u,v)∈E is associated with a positive cost (denoted by $c_e$), where the cost of (u,v) may be different from the cost of (v,u). Additionally, the following definitions consider the network as seen from the source node r of a multicast connection: (a) a non-source node u∈V−{r} is termed reachable if there is a directed path from source node r to node u, otherwise, node u is termed unreachable; (2) a reachable node u is called 2-reachable if G contains 2 node-disjoint paths from source node r to node u, otherwise, the reachable node u is called 1-reachable; (3) a node v (or link e) is termed a cut node (or cut link) of node u if its removal from G makes u unreachable from source node r; and (4) the graph G is termed strong 2-reachable with respect to source node r if every node v∈V−{r} is 2-reachable.

Figure 7A:
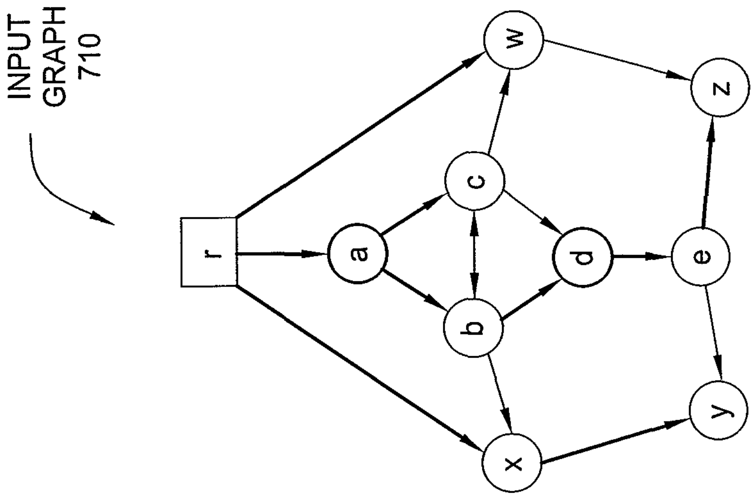
FIGS. 7A and 7B depict an RT-pair having cut elements, including an input graph and an RT-pair determined from the input graph.
Figure 7B:
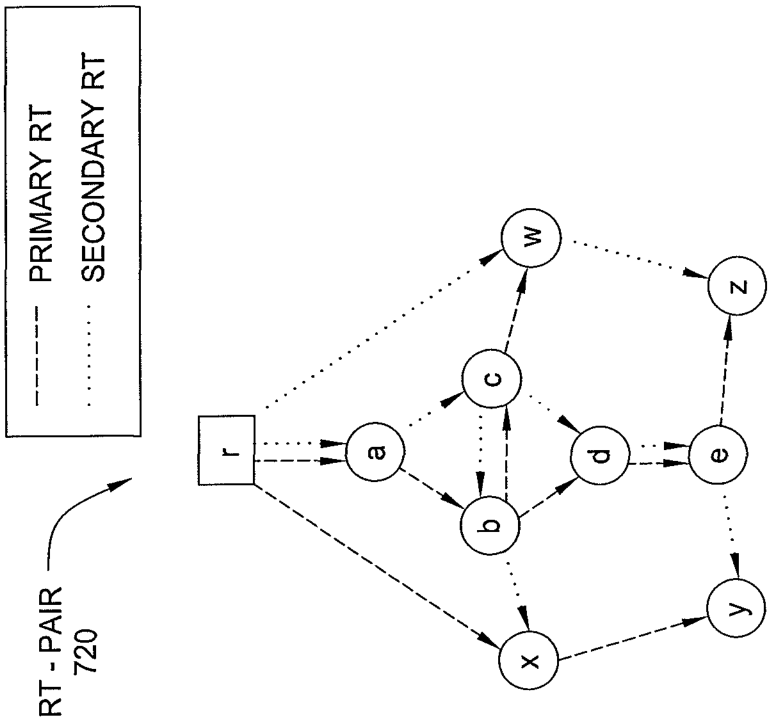

Additionally, in order to describe embodiments of the link-coloring procedure, it may be instructive to consider a definition of RTs. The definition of "RTs" (denoted as Definition 1) may be expressed by the following statements: (1) consider a graph G(V,E) that may include cut nodes and cut links, source node r, and a set of destinations D⊆V−{r}; (2) let $T_B$ and $T_R$ represent two trees rooted at source node r and providing P2MP connectivity from source node r to destination node D; (3) $P_B$(r,u)($P_R$(r,u)) denote the path from source node r to node u∈D in $T_B$($T_R$); and (4) $T_B$ and $T_R$ are referred to as RTs or an RT-pair if, for every u∈D,$P_B$(r,u) and $P_R$(r,u) are 2-node disjoint or they share only cut nodes and links of node u. As previously indicated, the two trees of an RT-pair may be referred to as blue trees and red trees (although it will be appreciated that any other suitable colors or terms may be used). It is noted that, unlike existing definitions of RTs, Definition 1 above also considers the presence of cut nodes and cut links. An example depicting cut nodes and links is depicted in FIGS. 7A and 7B. FIG. 7A depicts an input graph 710 (which may be denoted as a graph G(V,E)) with source node r that includes (1) cut nodes a and d and (2) cut links {(r,a),(d,e)}. FIG. 7A also depicts a spanning tree for input graph 710 of FIG. 7A by use of thicker lines for links of the spanning tree (illustratively, including links (r,x), (x,y), (r,a), (a,c), (a,b), (b,d), (d,e), (e,z), and (r,w)). FIG. 7B depicts an RT-pair 720 for input graph 710 depicted in FIG. 7A. As indicated by Definition 1, the two paths from source node r to any node u∈V−{r} along the red and blue RTs may share only cut nodes and cut links of u. It is noted that node u is not protected against a failure of a cut link or cut node; however, this is not a limitation that is specific to embodiments of the RT-based protection scheme presented herein (namely, for destination nodes that are only 1-reachable, other RT-based protection schemes fail to offer any protection against the failure of cut links or cut nodes). An RT-pair is termed optimal if its total cost is minimal. The problem of finding the optimal RTs is an extension of the directed Steiner tree and the directed survivable network design (SND) problems that are both known to be NP-hard and even hard to approximate. Various embodiments of the link-coloring procedure presented herein, however, may produce near optimal RTs in practice.

Figures 8A, 8B, 8C:
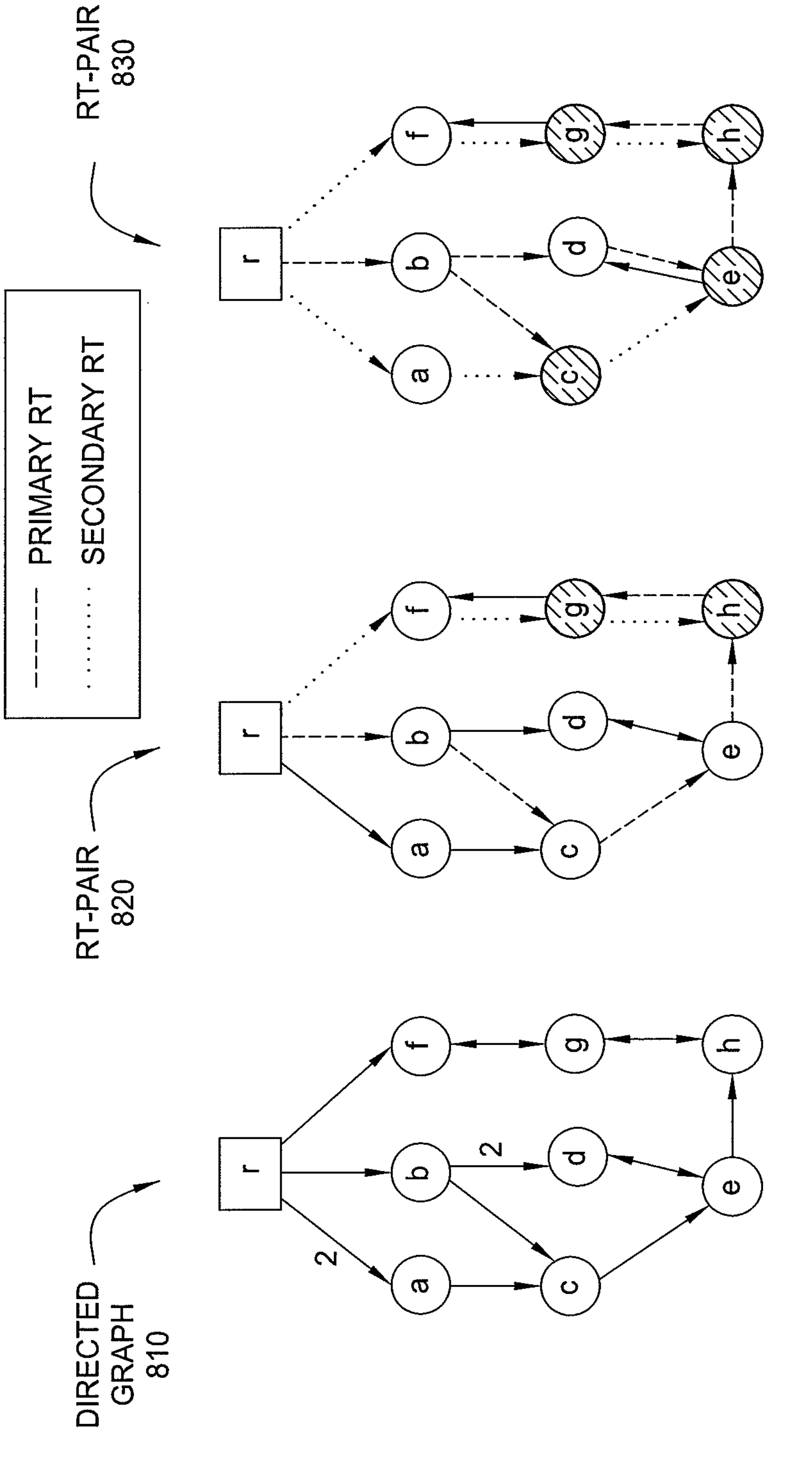
FIGS. 8A-8C depict an exemplary directed graph and two RT-pairs determined from the directed graph for two sets of destination nodes.

Additionally, in order to describe embodiments of the link-coloring procedure, it may be instructive to consider limitations of naïve RT construction. An example is depicted in FIGS. 8A-8C. FIG. 8A depicts an input graph 810 having a source node r and a set of nodes [a, b, c, d, e, f, g, h]. FIG. 8B depicts an RT-pair 820 determined from input graph 810 when the set of destination nodes is D={g,h}. Assume receipt of a request to add nodes (c,e) as destinations to RT-pair 820 of FIG. 8B. FIG. 8C depicts RT-pair 830, which is the only RT-pair that can span the four destinations (namely, D={c, e, g, f}). While node c can be easily added to RT-pair 820 of FIG. 8B, RT-pair 820 of FIG. 8B needs to be modified in order to add node e RT-pair 820 of FIG. 8B (i.e., the link (c,e) must be switched from red to blue). This example demonstrates that, unlike naïve designs for other types of trees, a naive RT design may prevent some nodes from joining the multicast connection without affecting the existing paths.

Additionally, in order to describe embodiments of the link-coloring procedure, it may be instructive to consider use of embodiments of the link-coloring procedure with the context of embodiments of a link-coloring-based scheme for protecting multicast connections. Embodiments of a link-coloring-based scheme for protecting multicast connections logically partition a given directed graph G(V,E) representing a network of nodes and links into two partitions, including a first partition that includes all of the nodes of the graph and a first subset of links of the graph and a second partition that includes all of the nodes of the graph and a second subset of the links of the graph. The two partitions may be obtained by a link-coloring procedure that is configured to color each link as either red or blue (and in which cut links are colored both as red and blue) in a way that the two partitions form two RDAGs of directed graph G. These sub-graphs are referred to as the red and blue RDAGs, and may be represented by the graphs $G_B$(V,$E_B$) and $G_R$(V,$E_R$), respectively. It is noted that the two RDAGs satisfy Property 1, which states that: (a) for every 2-reachable node u∈V−{r} it holds that any path $P_R$(r,u) from source node r to node u in $G_R$ is node disjoint from any path $P_B$(r,u) from source node r to node u in $G_B$; and (2) for every 1-reachable node u∈V−{r} it holds that any path $P_R$(r,u) from source node r to node u in $G_R$ shares only cut nodes and cut links of node u with a path $P_B$(r,u) from source node r to node u in $G_B$. If there are no cut links or cut nodes in G, then ($E_B$∩$E_R$)=Ø; otherwise, ($E_B$∩$E_R$) may include only cut links. For example, FIGS. 6C and 6D illustrate such red and blue RDAGs of directed graph 610 depicted in FIG. 6A with source node r. Consider now a multicast connection request M with source node r and a set of destination nodes D⊆V−{r}. Given the red and blue RDAGs described above, P2MP trees for M may be constructed in the blue and red partitions, respectively. The P2MP tree for M within a given RDAG may be constructed using any suitable tree construction mechanism (e.g., a shortest path tree construction procedure to provide a shortest path tree, a Steiner tree construction procedure to provide a Steiner tree, or the like, as well as various combinations thereof). In any event, Property 1 indicates that the two trees form an RT-pair. It will be appreciated that partitioning does not need to be performed for every connection request. FIG. 6B presents an RT-pair of a multicast connection sourced at source node r with destinations D={c,e,g,j,h}. Since this graph is strong 2-reachable, the RTs of the RT-pair induce two node disjoint paths to every destination node. It will be appreciated that, following provisioning of the RTs in the network for the multicast connection, any suitable protection mode can be used to provide protection for the multicast connection (e.g., using a 1:1 protection mode in which the source node r activates the standby tree when a failure occurs on the primary tree, using a 1+1 protection mode in which the primary and standby trees are simultaneously active for providing instantaneously recovery, or the like).

Figure 9:
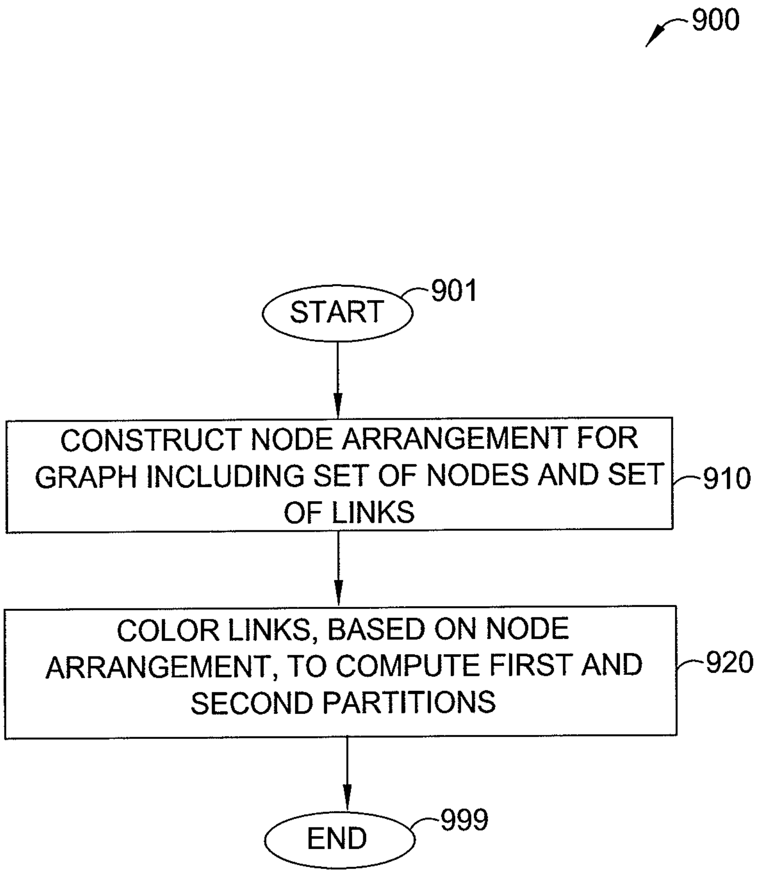
FIG. 9 depicts an embodiment of a method for determining a pair of partitions, for use in constructing an RT-pair, by coloring links based on a node arrangement.

In at least some embodiments, a link-coloring procedure is configured to calculate red and blue RDAGs that satisfy Property 1 of a given graph G(V,E) with source node r. Here, it is assumed that G is strong 2-reachable; however, this assumption may be removed for some embodiments (e.g., when the graph G include cut nodes or cut links). In at least some embodiments, the link-coloring capability is configured to calculate red and blue RDAGs that satisfy Property 1 of a given graph G(V,E) with source node r by constructing a node arrangement satisfying a set of properties and then using the node arrangement to compute two logical partitions, which form the red and blue RDAGs, based on the node arrangement. An exemplary embodiment of a method for determining an RT-pair based on a node arrangement is depicted in FIG. 9. It is noted that various embodiments of the link-coloring procedure obviate the need for various types of graph transformations, support cut nodes and cut links, and may provide various other advantages.

FIG. 9 depicts an embodiment of a method for determining a pair of partitions, for use in constructing an RT-pair, by coloring links based on a node arrangement. It will be appreciated that, although primarily depicted and described as being performed serially, at least some of the steps of method 900 may be performed contemporaneously or in a different order than depicted in FIG. 9. At step 901, method 900 begins. At step 910, a node arrangement is constructed for a graph including a set of nodes and a set of links. The node arrangement may be constructed based on method 1000 of FIG. 10. At step 920, the links are colored, based on the node arrangement, to compute first and second partitions that are used as the basis for computing the RTs of the RT-pair. At step 999, method 900 ends.

The construction of a node arrangement for use in computing two logical partitions may be better understood by considering the following definitions, properties, and observations.

Let L be an ordered list of the nodes $v \in V$ of graph G, where the first and last elements in the list are r and every other element in the list uniquely represents one of the non-source nodes $v \in V-\{r\}$. The list L is termed a complete node arrangement if it contains every node $v \in V$ and every non-source node has an incoming neighbor both before and after it in list L. In order to calculate a complete or partial node arrangement, an auxiliary data structure (referred to herein as a skeleton list) is used. Given a graph G(V,E) and $r \in V$, a node collection for graph G is defined as a collection $\hat{L}=\{U_1=\{r\}, U_2 \ldots, U_m=\{r\}\}$ with three or more sets of nodes that together include all the nodes, V. The first and the last sets, $U_1$ and $U_m$, include only the source node r (note that only source node r is represented twice in the list L). Every other set, $U_j$, includes one or more non-source nodes and, further, is pairwise disjoint with every other set. Each set $U_j$ includes a special node that is designated as the set anchor and is denoted by anchor($U_j$). By default, anchor($U_1$)=anchor($U_m$)=r. Also, if $u \in U_j$ and anchor($U_j$)=v we say that anchor(u)=v.

Consider the following definition (denoted herein as Definition 2) of a skeleton link: a skeleton list is a collection $\hat{L}=\{U_1=\{r\}, U_2, U_3, \ldots U_m=\{r\}\}$ of node sets that satisfies the following two conditions for every set $U_j \in \hat{L}, 1<j<m$: (a) there is a directed path from anchor($U_j$) to every other node in ($U_j$) and (b) anchor($U_j$) has incoming neighbors in sets both before and after ($U_j$) in $\hat{L}$.

Consider a link $(u,v) \in E$ with end-points in two different sets in $\hat{L}$, and let $U_U$ and $U_v$ be the sets that contain nodes u and v, respectively. If $U_U$ is before $U_v$ is $\hat{L}$ then (u,v) is referred to as a forward link; otherwise, (u,v) is referred to as a backward link. A link $(u,v) \in E$ with end-points in the same set in $\hat{L}$ is referred to as an internal link. For a node $v \in V-\{r\}$, a path from source node r to node v is referred to as a forward path if it includes only forward and internal links. Similarly, a path is referred to as a backward path if it includes only backward and internal links.

Consider the following property (denoted herein as Property 2) which is satisfied by the skeleton lists: given a graph G(V,E), a source node r, and a skeleton list $\hat{L}=\{U_1=\{r\}, U_2 \ldots U_m=\{r\}\}$, for every anchor $v \in V-\{r\}$, the skeleton list $\hat{L}$ induces at least one forward path and one backward path from source node r to node v and every forward path from source node r to node v is node-disjoint from any backward path from source node r to node v. If every node $v \in V$ is an anchor in the skeleton list $\hat{L}$, then the skeleton list $\hat{L}$ is said to be a complete node arrangement; otherwise, it defines a partial node arrangement. A partial node arrangement where every 2-reachable node is an anchor node is said to be an unrefinable partial node arrangement.

The construction of the node arrangement may be based on the following observation (denoted herein as Observation 1): given a graph G(V,E), source node $r \in V$, and a spanning tree T rooted at source node r: consider any subtree $\hat{T}$ ($\neq$T) of T with root node $w \in V-\{r\}$, then for any 2-reachable node $u \in \hat{T}-\{w\}$ there is a path from source node r to node u that does not include node w. Note that, if this is not the case, w is a cut node for node u, which implies that u is not 2-reachable. The construction of the node arrangement may include constructing a spanning tree rooted at source node r, creating an initial skeleton list (denoted as $\hat{L}$) based on the spanning tree, and iteratively refining the skeleton list $\hat{L}$ based on observation 1 until every 2-reachable node is an anchor node. It is noted that if the given graph is strong 2-reachable then the final skeleton-list provides a complete node arrangement (denoted herein as Theorem 1); otherwise, the skeleton list $\hat{L}$ provides an unrefinable partial node arrangement, in which case, it can be shown that for every set $U \in \hat{L}$ with two or more nodes, anchor(U) is a cut node for all of the other nodes in U.

In at least some embodiments, the creation of an initial skeleton list $\hat{L}$ based on a spanning tree, for use in constructing the node arrangement, may be performed as follows. Here, assume that the spanning tree is a directed spanning tree T rooted at source node r. An initial skeleton list $\hat{L}$ is constructed based on the spanning tree. The initial skeleton list $\hat{L}$ includes |S|+2 sets, where S is the set of outgoing neighbors of source node r in the directed spanning tree T. The first and last sets of the skeleton list $\hat{L}$ include only source node r. The other sets of the skeleton list $\hat{L}$ may be created as follows: (1) for every node $v \in S$, a set $U_v$ is created that includes all of the nodes in the sub-tree of directed spanning tree T rooted at node v, and (2) the set $U_v$ is then inserted into the skeleton list $\hat{L}$ with anchor(U)=v and $\forall u \in U$,anchor(u)=v. It is noted that, independent of the order in which these sets are inserted into the skeleton list $\hat{L}$ between the first and last sets containing source node r, the result is a valid skeleton list $\hat{L}$ by definition since the first and the last sets contain source node r and source node r is an incoming neighbor of anchor($U_j$) of every other set $U_j \in \hat{L}$. Therefore, skeleton list $\hat{L}$ satisfies Property 2. An exemplary embodiment of a method for constructing a node arrangement for use in determining an RT-pair based on an iterative skeleton list refinement is depicted in FIG. 10.

Figure 10:
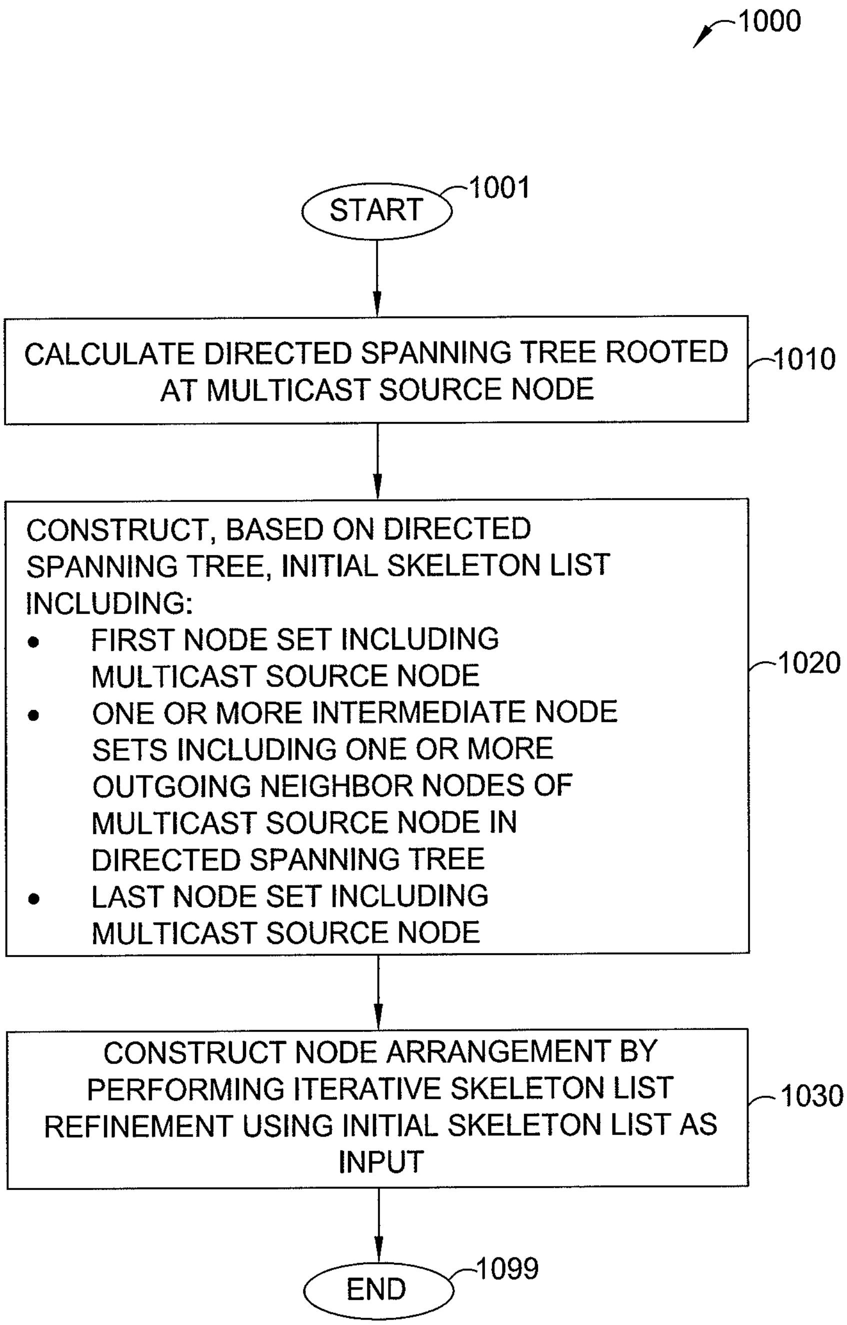
FIG. 10 depicts an embodiment of a method for constructing a node arrangement, for use in determining a pair of partitions, based on an iterative skeleton list refinement.

FIG. 10 depicts an embodiment of a method for constructing a node arrangement, for use in determining a pair of partitions, based on an iterative skeleton list refinement. The method 1000 of FIG. 10 may be used within step 910 of method 900 of FIG. 9 in order to construct a node arrangement. It will be appreciated that, although primarily depicted and described as being performed serially, at least some of the steps of method 1000 may be performed contemporaneously or in a different order than depicted in FIG. 10. At step 1001, method 1000 begins. At step 1010, a directed spanning tree, rooted at the multicast source node, is calculated. At step 1020, an initial skeleton list is constructed based on the directed spanning tree. The initial skeleton list includes a first node set including the multicast source node, one or more intermediate node sets including one or more outgoing neighbor nodes of the multicast source node in the directed spanning tree, and a last node set including the multicast source node. At step 1030, the node arrangement is constructed by performing an iterative skeleton list refinement using the initial skeleton list as input. At step 1099, method 1000 ends.

In at least some embodiments, the iterative refinement of the skeleton list $\hat{L}$, for use in constructing the node arrangement, may be performed as follows. The following steps may be performed at each iteration. First, a set $U_v$ with anchor($U_v$)=v that includes a non-anchor node w with an incoming neighbor u in a different set is identified. Then, a new set $U_w$ with anchor($U_w$)=w is created, and node w and the spanning tree descendents of node w in set $U_v$ are moved into new set $U_w$. The new set $U_w$ is then placed in the skeleton list $\hat{L}$ between the set $U_v$ and the set including node u, (which is denoted by $U_U$). If set $U_U$ appears before set $U_v$ in skeleton list $\hat{L}$, then set $U_w$ is inserted just before set $U_v$ in skeleton list $\hat{L}$; otherwise, set $U_w$ is inserted immediately after set $U_v$ in skeleton list $\hat{L}$. It is noted that this continues to be a valid node arrangement since the newly inserted anchor($U_w$) has incoming neighbors on both sides and they are in the sets $U_U$ and $U_v$. The node u is in $U_U$ and since node w was in $U_v$ before this refinement, there must be some node $x \in U_v$ such that (x,w) is a link in the initial spanning tree T. Accordingly, as discussed above, the refinement process repeatedly identifies a link $(u,w) \in E$ such that anchor(u) ≠anchor(w) and anchor(w)≠w and then adds into the skeleton list $\hat{L}$ a new set with its anchor as w. It is noted that, from Observation 1 it holds that if a set U includes non-anchor 2-reachable nodes, it has such a node w. Thus, the refinement process ends when every 2-reachable node is an anchor node of a set in the skeleton list $\hat{L}$. An exemplary embodiment of a method for use in performing an iterative skeleton list refinement is depicted in FIG. 11.

Figure 11:
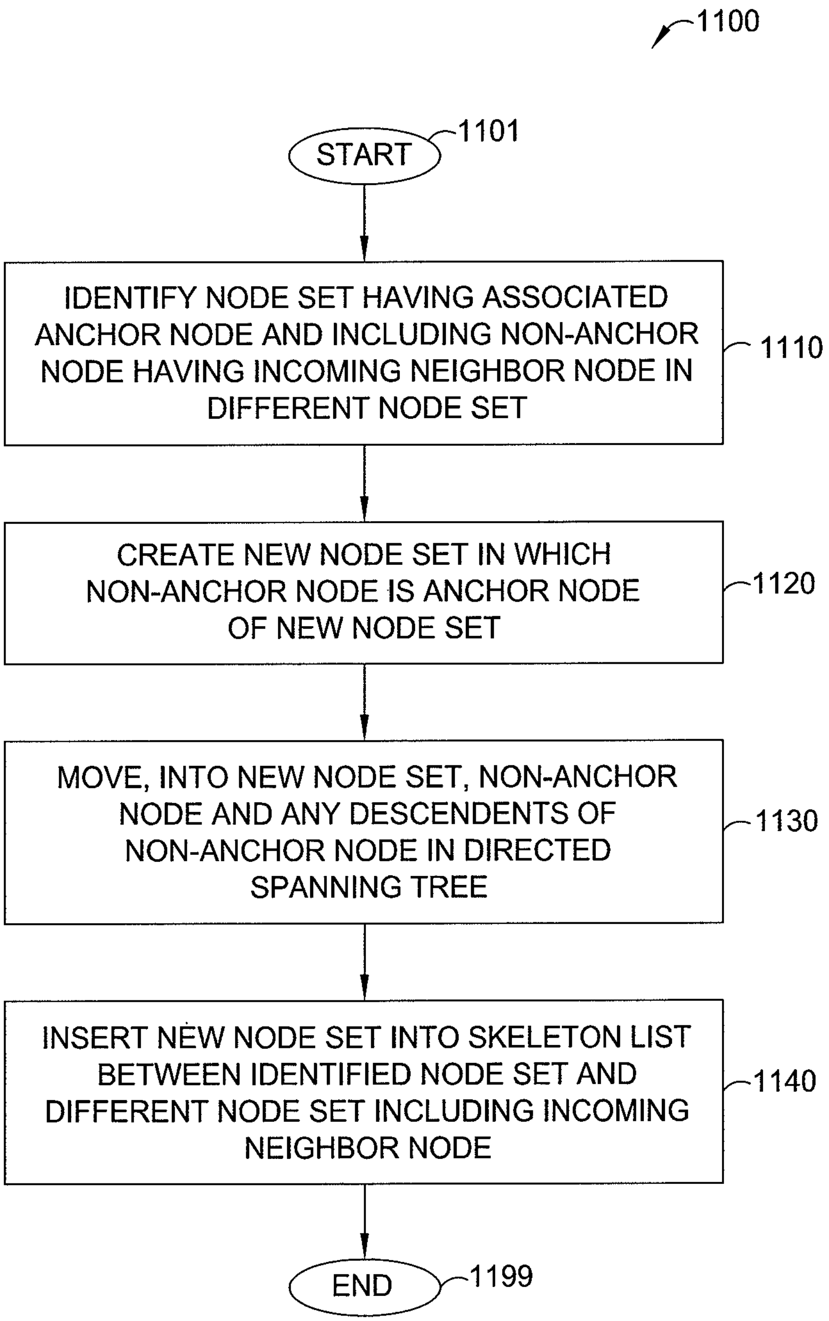
FIG. 11 depicts an embodiment of a method for use in performing an iterative skeleton list refinement.

FIG. 11 depicts an embodiment of a method for use in performing an iterative skeleton list refinement. The method 1100 of FIG. 11 may be used at each of one or more iterations of an iterative skeleton list refinement process. The method 1100 of FIG. 11 may be used within step 1030 of method 1000 of FIG. 10 in order to perform an iterative skeleton list refinement. It will be appreciated that, although primarily depicted and described as being performed serially, at least some of the steps of method 1100 may be performed contemporaneously or in a different order than depicted in FIG. 11. At step 1101, method 1100 begins. At step 1110, a node set is identified. The identified node set has an associated anchor node and includes a non-anchor node having an incoming neighbor node in a different node set. At step 1120, a new node set is created. The new node set is created such that the non-anchor node is the anchor node of the new node set. At step 1130, the non-anchor node and any descendents of the non-anchor node in the directed spanning tree are moved into the new node set. At step 1140, the new node set is inserted into the skeleton list between the identified node set and the different node set including the incoming neighbor node. At step 1199, method 1100 ends.

Figure 12A:
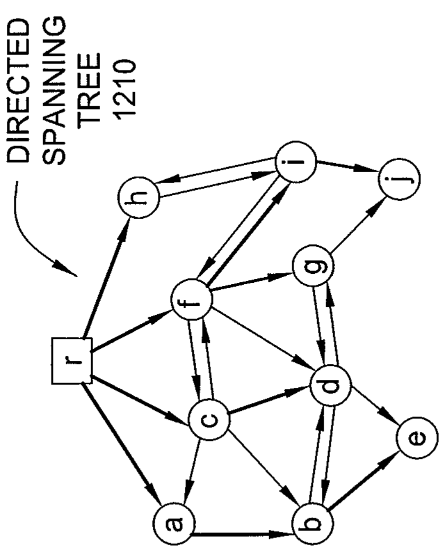
FIGS. 12A-12D depict an exemplary construction of a node arrangement based on an input graph using skeleton list refinement.
Figure 12D:
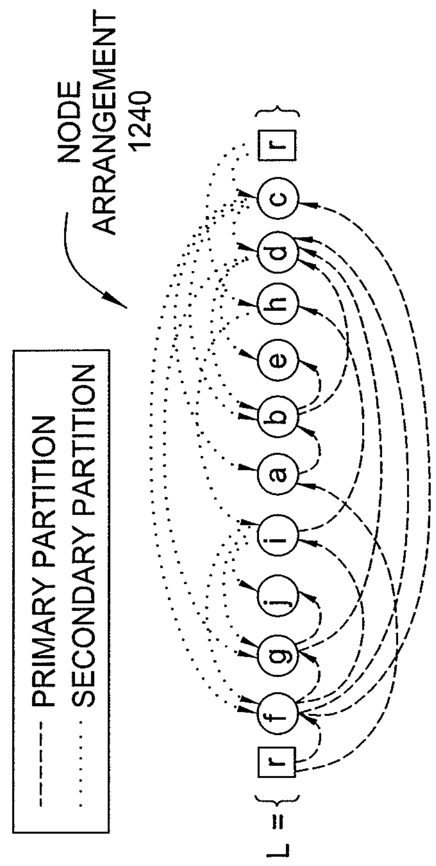
Figure 12B:
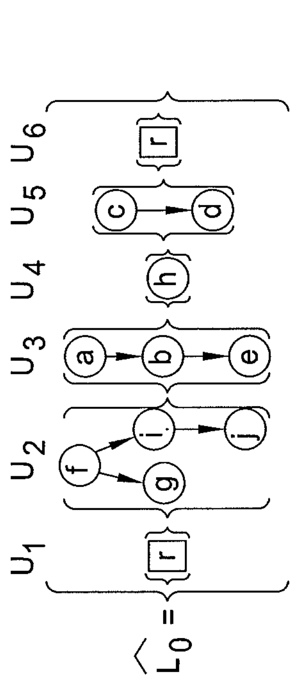
Figure 12C:
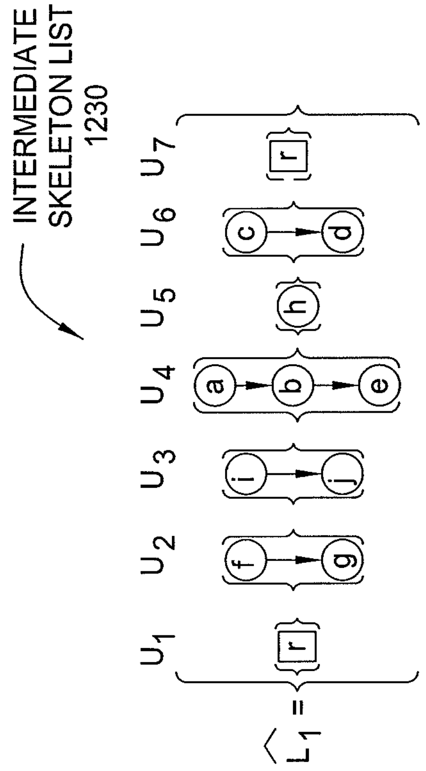

FIGS. 12A-12D depict an exemplary construction of a node arrangement based on an input graph using skeleton list refinement. FIG. 12A depicts a directed spanning tree 1210 (denoted as spanning tree T) for the directed graph 610 of FIG. 6A. In FIG. 12A, directed spanning tree 1210 is denoted by use of thicker lines for links of the directed spanning tree (illustratively, including links (r,a), (a,b), (b,e), (r,c), (c,d), (r,f), (f,g), (f,i), (i,j), and (r,h)), FIG. 12B depicts the initial skeleton list 1220 (denoted as initial skeleton list $\hat{L}_0$) corresponding to the directed spanning tree 1210. In initial skeleton list 1220, each outgoing neighbor r in directed spanning tree 1210, say v, defines a set with anchor(v). FIG. 12C depicts an intermediate skeleton list 1230 (denoted as intermediate skeleton list $\hat{L}_1$) after a first iteration of skeleton list refinement based on initial skeleton list 1220. Initially, node i is a non-anchor node in the set $U_2 \in \hat{L}_0$. Since, node h is an incoming neighbor of node i that is not included in $U_2$, node i and its descendent, node j, are removed from the set $U_2$ and inserted to $\hat{L}$ as a new set $U_3=\{i,j\}$ with anchor($U_3$)=i, as depicted in intermediate skeleton list 1230. FIG. 12D depicts the complete node arrangement 1240 for directed spanning tree 1210 of FIG. 12A following completion of the skeleton list refinement process for directed spanning tree 1210 of FIG. 12A.

In at least some embodiments, use of the node arrangement to compute two logical partitions which form the red and blue RDAGs (which also may be referred to as coloring the links of the graph for computing the red and blue RDAGs) may be performed as follows. Consider a link $(u,v) \in E$, where u≠r. If link (u,v) is a forward link it is colored red; otherwise, if link (u,v) is a backward link it is colored blue. The internal links are considered later. For all links $(r,u) \in E$ where node u is an outgoing neighbor of source node r, special consideration is necessary. Since source node r is both to the left and right of node u in skeleton list $\hat{L}$,(r,u) could be either red or blue. The coloring of such a link may be performed in a manner for ensuring that the two RDAGs induce two node disjoint paths to every outgoing neighbor node u of source node r. This can be achieved only if every such node u has another non-source incoming neighbor with a link of a different color. Accordingly, the coloring of such a link may be performed by: (1) if all the incoming non-source neighbors of node u appear after (before) node u in skeleton list $\hat{L}$, then the link (r,u) is colored red (blue) and added to the red (blue) RDAG, (2) if node u does not have any other incoming neighbor beside source node r then link (r,u) is a cut link and, thus, is colored both red and blue and added to both of the RDAGs, or (3) in other cases, the link (r,u) may be added to one of the two RDAGs based on suitable criteria (e.g., balancing the number of red and blue outgoing links from the source node r or any other suitable criteria). As a result of Property 2, for any given strong 2-reachable graph G(V,E), the above procedure computes red and blue RDAGs that satisfy Property 1. The red and blue RDAGs ensure that, for every node $v \in V-\{r\}$, the red (blue) RDAG includes all of the possible forward (backward) paths from source node r to node v and any pair of forward and backward paths from source node r to node v are node disjoint. As an example, FIG. 12D illustrates the link coloring that results from the corresponding node arrangement, thereby yielding the two RDAGs depicted in FIGS. 6C and 6D. An exemplary embodiment of a method for coloring links based on a node arrangement to determine an RT-pair is depicted in FIG. 13.

Figure 13:
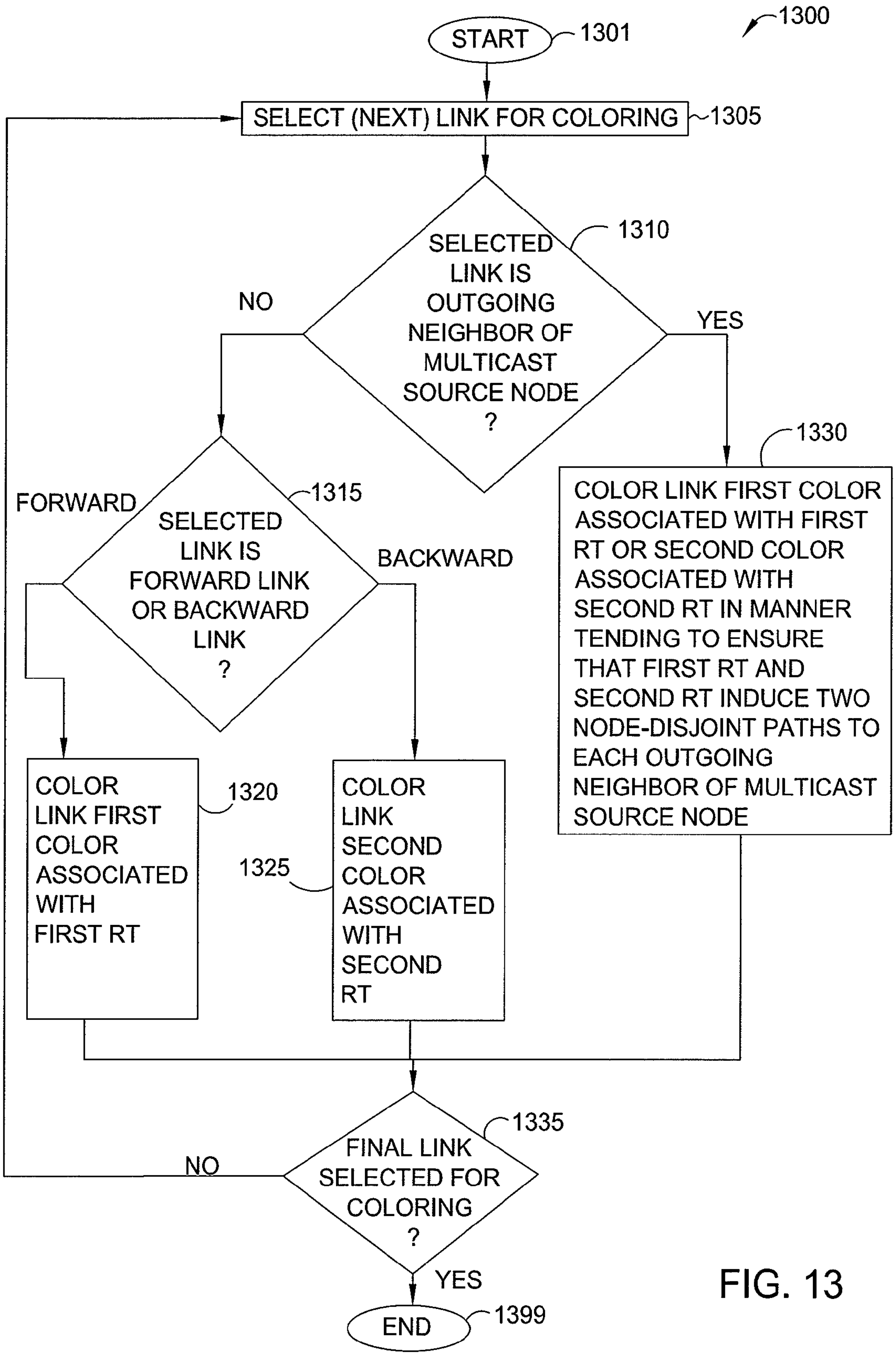
FIG. 13 depicts an embodiment of a method for coloring links based on a node arrangement to determine a pair of partitions for use in constructing an RT-pair.

FIG. 13 depicts an embodiment of a method for coloring links based on a node arrangement to determine a pair of partitions for use in constructing an RT-pair. The method 1300 may be used to color links of a directed graph that includes a set of nodes (including a multicast source node as its root node) connected via a set of links. The method 1300 of FIG. 13 may be used as step 920 of method 900 of FIG. 9. The method 1300 may color links a first color associated with a first partition (used as a basis for constructing a first RT of the RT-pair) or a second color associated with a second partition (used as a basis for constructing a second RT of the RT-pair). It will be appreciated that, although primarily depicted and described as being performed serially, at least some of the steps of method 900 may be performed contemporaneously or in a different order than depicted in FIG. 9.

At step 1301, method 1300 begins.

At step 1305, a (next) link is selected for coloring. The link is selected from the set of links of the graph not previously selected for coloring within the context of method 1300.

At step 1310, a determination is made as to whether the selected link is an outgoing neighbor of the multicast source node. If the selected link is not an outgoing neighbor of the multicast source node, method 1300 proceeds to step 1315. If the selected link is an outgoing neighbor of the multicast source node, method 1300 proceeds to step 1330.

At step 1315, a determination is made as to whether the selected link is a forward link or a backward link. If the selected link is a forward link, method 1300 proceeds to step 1320, at which point the link is colored the first color associated with the first RT. If the selected link is a forward link, method 1300 proceeds to step 1325, at which point the link is colored the second color associated with the second RT. From steps 1320 and 1325, method 1300 proceeds to step 1335.

At step 1330, the link is colored either the first color or the second color in a manner tending to ensure that the first RT and the second RT induce two node-disjoint paths to each outgoing neighbor of the multicast source node. For example, the link may be colored the first color based on a determination that all incoming non-source neighbor nodes of the outgoing neighbor node appear after the outgoing neighbor node in the node arrangement, or may be colored the second color otherwise. For example, the link may be colored both the first color and the second color based on a determination that the only incoming neighbor of the outgoing neighbor node is the multicast source node. For example, the link may be colored the first color or the second color based on one or more criteria. From step 1330, method 1300 proceeds to step 1335.

At step 1335, a determination is made as to whether the final link has been selected for coloring. If the final link has not been selected for coloring, method 1300 returns to step 1305, at which point a next link is selected for coloring. If the final link has been selected for coloring, method 1300 proceeds to step 1399, at which point method 1300 ends.

At step 1399, method 1300 ends.

It will be appreciated that, although primarily depicted and described with respect to embodiments in which links are selected for coloring without regard for whether the links are outgoing neighbors of the multicast source node, in at least some embodiments, links may be processed as two groups based on whether the links are outgoing neighbors of the multicast source node (e.g., performing steps 1315, 1320, and 1325 for each link that is not an outgoing neighbor of the multicast source node; performing step 1330 for each link that is an outgoing neighbor of the multicast source node).

Figure 14A:
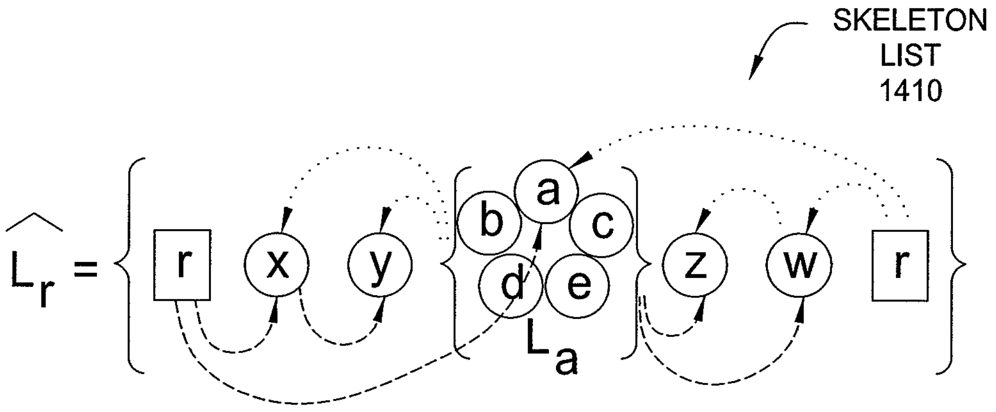
FIGS. 14A-14C depict an exemplary skeleton list construction for the input graph of FIG. 7A which includes cut elements.
Figure 14B:
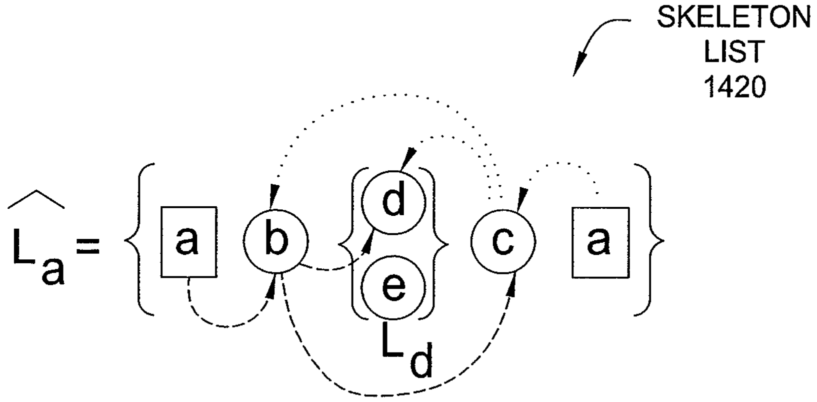
Figure 14C:
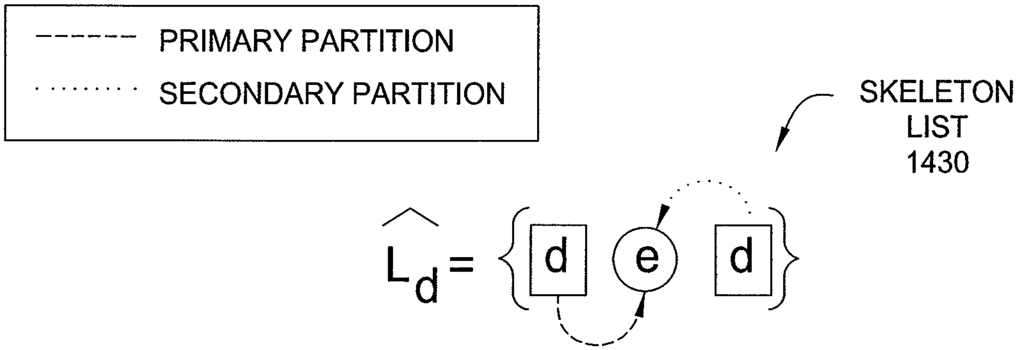

As described above, various embodiments of the link-coloring procedure may be configured to support handling of a graph including cut nodes or cut links. Here, the link-coloring procedure may be configured to determine two logical partitions that satisfy Property 1. Consider such a graph G(V,E) with source node r and let $\hat{L}$ be a refined skeleton list of G after the link-coloring procedure as discussed above (namely, link coloring without accounting for cut nodes or cut links) has been applied. If the refined skeleton list $\hat{L}$ is a complete node arrangement, then G is strong 2—reachable (without cut nodes or cut links) and no further processing is needed; otherwise, refined skeleton list $\hat{L}$ defines an unrefinable partial node ordering and there exist some internal links that are not yet colored. It is noted that every 2-reachable node $u \in V-\{r\}$ is an anchor node in the refined skeleton list $\hat{L}$. In addition, from Property 2 it follows that every anchor node $u \in V-\{r\}$ has both forward and backward paths from source node r, and every pair of forward and backward paths from source node r to node u are node-disjoint. Since all of the forward and backward links are already colored red and blue, respectively, calculation of the red and blue partitions may be finalized by coloring the internal links (which have not yet been colored) in a way that preserves Property 1. In other words, every node $u \in V-\{r\}$ should have both forward and backward paths comprised only of red or blue links (no internal links), respectively. If node u is 2-reachable then every pair of forward and backward paths of node u are node disjoint; otherwise, the forward and backward paths of node u are only allowed to share cut nodes and cut links of node u. The coloring of internal links is based on the following observation (denoted as Observation 2): considering a set $U \in \hat{L}$ with two or more nodes and anchor node anchor(U)=w and recalling that every node $v \in U-\{w\}$ is 1-reachable where node w is its cut node, then every path from source node r to any node $v \in U-\{w\}$ passes through node w. Therefore, (a) there is no link $(x,v) \in E$ such that $x \notin U$ (i.e., every incoming link of a node $v \in U-\{w\}$ is an internal link) and (b) as a result of (a), any path from node w to any node in $U-\{w\}$ includes only nodes in U. Thus, in order to color the internal links, the following condition must be satisfied: there are red and blue paths from node w to every node $v \in U-\{w\}$, and every red path ($P_R(w,v)$) and any blue path ($P_B(w,v)$) may share only cut nodes/links of node v in the set U. It is noted that this condition is equivalent to Property 1 for the graph $H(U,E_U)$ including all of the nodes in U and their internal links (where anchor(U) is the source). Thus, the link-coloring procedure as discussed above (namely, link coloring without accounting for cut nodes or cut links) can be applied recursively and the recursion is guaranteed to terminate since the depth of recursion can be, at most, $|U|-1$. It is noted that, in addition to handling of cut nodes, any cut link $(u,v), u \neq r$ also may be handled since, in such case, node u is also a cut node. FIGS. 14A-14C depict an exemplary skeleton list construction for the input graph of FIG. 7A which includes cut elements. In this example: (1) nodes a and d of the input graph of FIG. 7A are detected as cut nodes and, thus, are processed according to recursive use of the skeleton list refinement procedure, and (2) the links (r,a) and (d,e) of the input graph of FIG. 7A are cut links and, thus, each belong in both the blue and red partitions as depicted in FIG. 7B. FIG. 14A depicts an initial skeleton list 1410 for the input graph of FIG. 7A which includes cut elements.

FIG. 14B depicts a refined skeleton list 1420 for node a. FIG. 14C depicts a refined skeleton list 1430 for node d.

As described above, various embodiments of the link-coloring procedure may be configured to support handling of topology changes (e.g., a failure of a node or link, an addition of a node or link, or the like). In the case of a topology change, it is desirable to minimize the impact of the topology change on the RT-pairs of active multicast connections. Accordingly, in at least some embodiments, the link-coloring procedure may be configured to modify the red and blue RDAGs for maintaining Property 1 in a manner for minimizing the number of links for which the associated link color is changed. The handling of topology changes may be performed using a re-partitioning process that is configured to modify the red and blue RDAGs for maintaining Property 1 in a manner for minimizing the number of links for which the associated link color is changed. It is noted that a link changes its color only when the nodes which form the two endpoints of the link change their relative order in the node ordering L. Thus, the repartitioning procedure may be configured to minimize the number of neighboring nodes that change their relative order in the node ordering L. For purpose of simplifying the description of handling of topology changes, consider a single topology change event at a time.

In at least some embodiments, the repartitioning procedure may be configured to handle addition of a node or a link. Typically, adding a new element does not affect an existing RT-pair, unless the RT-pair includes cut nodes or cut links. In the case in which the RT-pair includes cut nodes or cut links, the new element may provide alternative paths that bypass some of these elements.

In at least some embodiments, the repartitioning procedure may be configured to handle addition of a node or a link in a strong 2-reachable graph. For a strong 2-reachable graph, the addition of an element does not cause color change to any existing link; rather, a new link is colored either red or blue based on whether it is a forward or a backward link, respectively, as defined by L. A new node with two or more incoming neighbors is inserted between its incoming neighbors in L and its links are colored according to its location in L. If the new node has a single incoming link, then this is a cut link and it is inserted to both RDAGs. The node is inserted to the set $U \in \hat{L}$ of its incoming neighbor.

In at least some embodiments, the repartitioning process may be configured to handle addition of a node or a link in a 1-reachable graph. It is noted that special treatment may be required when the graph includes cut elements. Consider a 1-reachable node, say node w, with a new incoming edge and let G denote the graph before adding the new edge. Let node u be the closest cut node of node w in any path from source node r to node w in graph G, and let $T_u$ be the sub-tree of T (the original spanning tree of G) rooted at node u and including all of the 1-reachable nodes descending from node u. In order to re-recalculate the RDAGs, the sub-tree $T_u$ is assigned to the set $U_j$ with anchor node u and the skeleton list refinement procedure is again invoked. After this procedure, some of the nodes in sub-tree $T_u$ may be detected as 2-reachable nodes and node u ceases to be a cut node for those nodes. It is noted that various embodiments of the repartitioning process that may be configured to handle addition of a node or a link may be better understood by way of the example depicted in FIGS. 15A-15C.

Figure 15A:
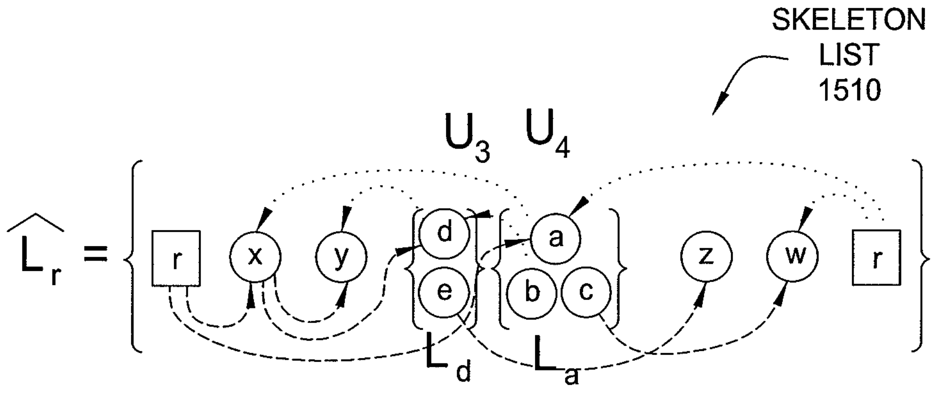
FIGS. 15A-15C depict an exemplary recalculation of the RT-pair calculated based on the input graph of FIG. 7A when a link is added.
Figure 15B:
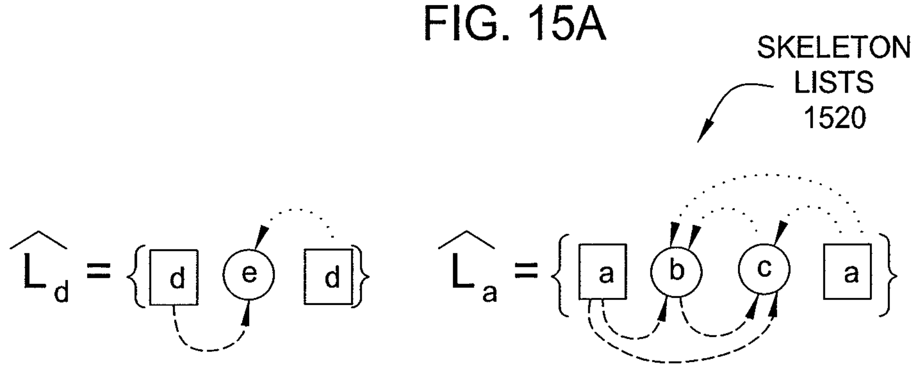
Figure 15C:
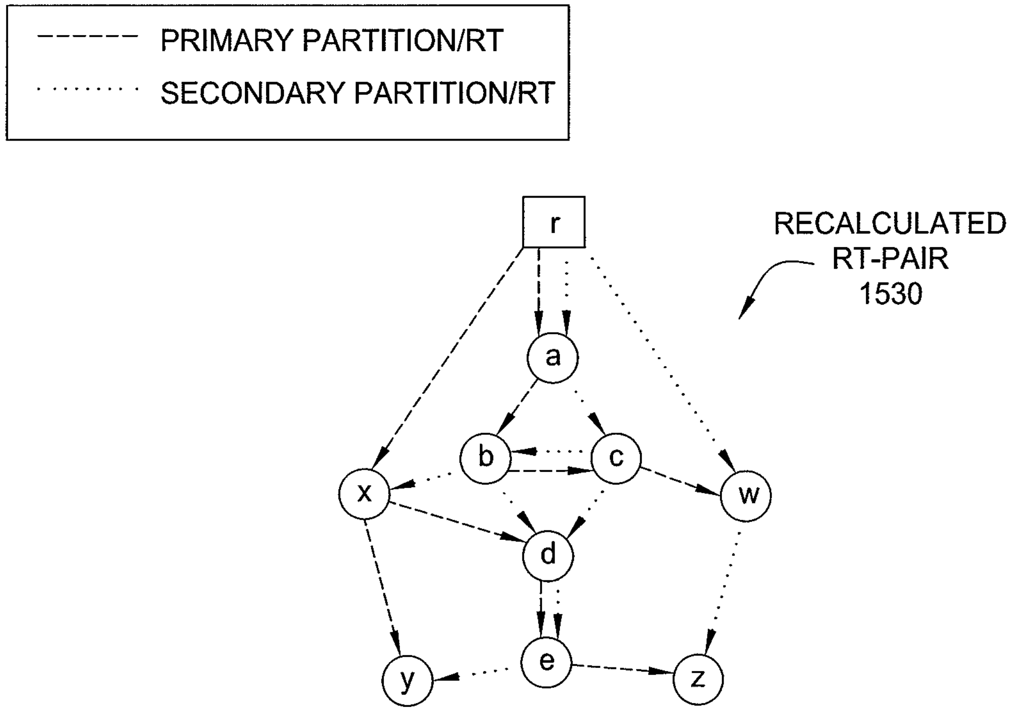

FIGS. 15A-15C depict an exemplary recalculation of the RT-pair calculated based on the input graph of FIG. 7A when a link is added. Namely, in this example, consider the input graph 710 depicted in FIG. 7A with cut nodes a and d, and assume that the link (x,d) was added to the input graph 710 of FIG. 7A. In this case, node d is a 1-reachable node and its closest cut node is node a. The skeleton list refinement procedure re-refines the set U={a,b,c,d,e} with anchor(U)=a, thereby producing skeleton list 1510 depicted in FIG. 15A. At this point, node d is 2-reachable and it is an anchor node in $\hat{L}$. The skeleton list refinement procedure performs a recursive call for refining the set $U_3${d,e} and the set $U_4$={a,b,c} with anchor nodes d and a, respectively, thereby producing the skeleton lists 1520 depicted in FIG. 15B. FIG. 15C depicts the recalculated RT-pair 1530 (in this case, RDAGs) resulting from recalculation after addition of the link (x,d) to the input graph 710 of FIG. 7A. After the re-partitioning, the link (x,d) is colored red and the RDAGs are guaranteed to provide node-disjoint paths from source node r to node d (e.g., the solid lines). It is noted that, in this example, only link (b,d) changes its color from red to blue.

In at least some embodiments, the repartitioning process may be configured to handle failure of a node or a link. It is noted that, after recalculating the RDAGs, the color of some links may have changed. Thus, a tree of a given RT-pair may include both red and blue links. This does not create any concern if the failed element is not included in the RT-pair and all the destination nodes are still reachable on both trees. Otherwise, the paths for affected destinations are rerouted for providing maximal protection to these destinations. In this case, paths that include both red and blue links also may be rerouted. As indicated above, removal of a node or a link does not necessarily change the RDAGs, if each non-source node has both red and blue incoming edges. If some nodes have incoming links (two or more) only of a single color either blue or red, their location in L is modified for maintaining Property 1. Such nodes are referred to herein as affected nodes. Assume that after a topology change some nodes are affected. Let node w be the right (left) most affected node with only red (blue) incoming links. We move node w forward (backward) in the node ordering to ensure that it has both red and blue incoming links. In order to minimize the number of link color changes, find the closest incoming neighbor of node w in the skeleton list $\hat{L}$ (e.g., node u in the set $U_j \in \hat{L}$) and add node w (and potentially all of the other nodes in its set in node w) as a descendent of node u to the set $U_j$. It is noted that, after this operation, the color of some of the outgoing links of node w may change and, thus, some other node may be affected. This process is repeated until there are no more affected anchor nodes with all their incoming links of the same color. After this set consolidation process, the skeleton list refinement procedure is executed in order to recalculate the new positions of the affected nodes. Since each affected node is inserted into the closest set in $\hat{L}$, in which it has an incoming neighbor, only one of its incoming links should change its color. This ensures minimal modifications to the RDAGs. It is noted that various embodiments of the repartitioning process that may be configured to handle failure of a node or a link may be better understood by way of the example depicted in FIGS. 16A-16C.

Figure 16A:
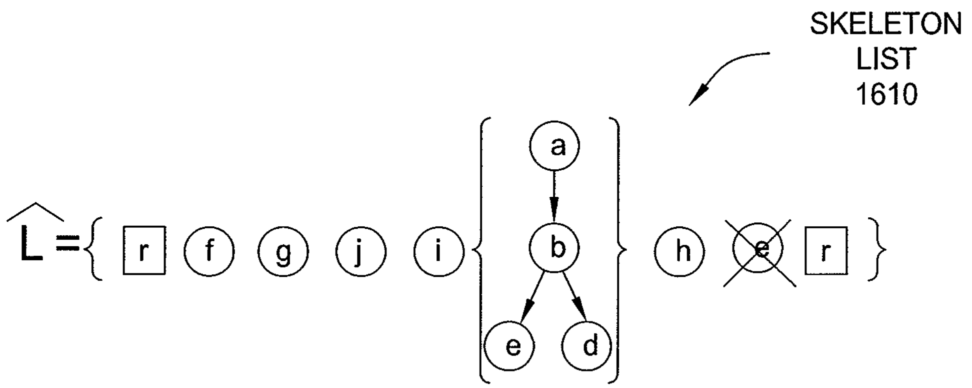
FIGS. 16A-16C depict an exemplary recalculation of the RT-pair calculated based on the input graph of FIG. 6A when a node fails.
Figure 16B:
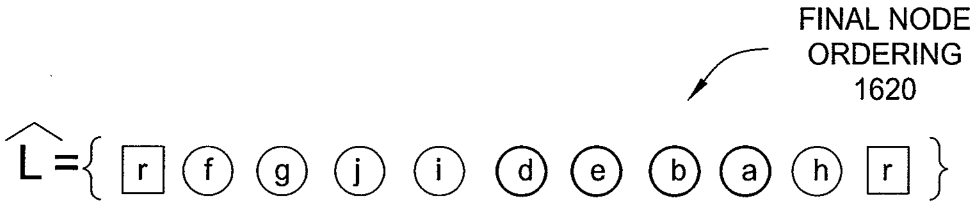
Figure 16C:
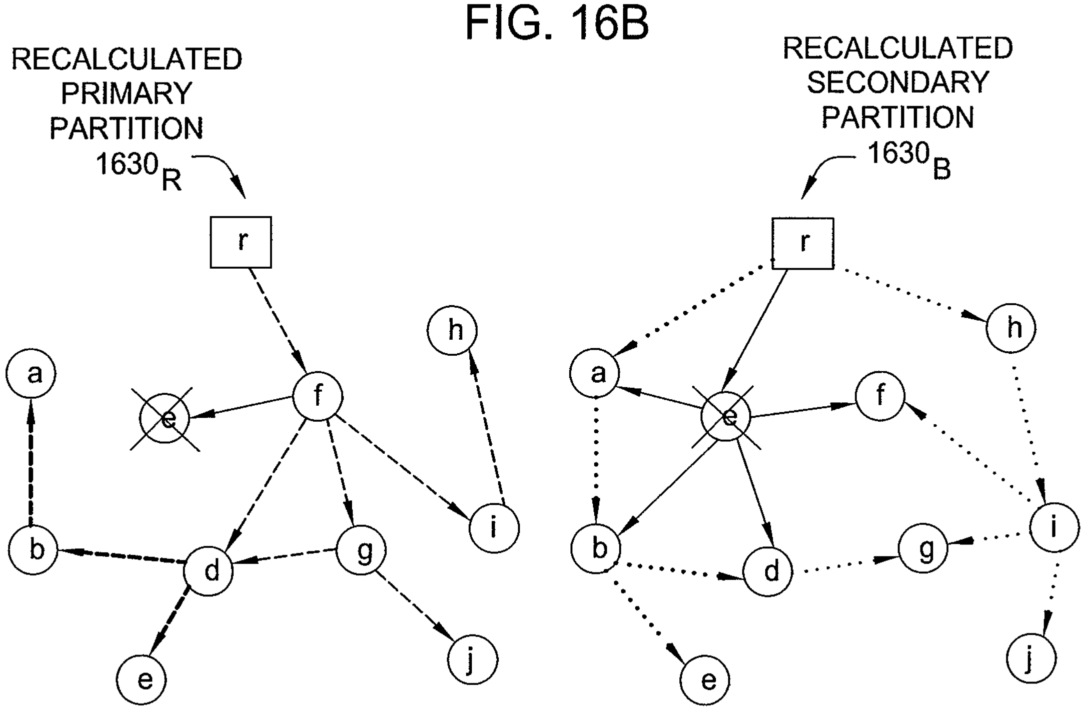

FIGS. 16A-16C depict an exemplary recalculation of the RT-pair calculated based on the input graph of FIG. 6A when a node fails. Namely, consider the input graph 610 depicted in FIG. 6A with the RDAGs shown in FIG. 6C (illustratively, red partition $\mathbf{630}_R$) and FIG. 6D (illustratively, blue partition $\mathbf{630}_B$) and the node ordering depicted in FIG. 12D. Assume a failure of node c. As a result, nodes b and d do not have blue incoming links. Node a also does not have a blue incoming link, but, since it is outgoing neighbor of the multicast source node, the link (r,a) may be colored both as red and blue. Since node d is the right-most affected node, it is inserted to the set of node b. Consequently, node e loses its blue incoming link and is inserted to the set of node b as well. Now, node b is the most affected node. Node b and its set U={b,d,e} are inserted to the set of node a. FIG. 16A depicts the resulting skeleton list 1610. FIG. 16B depicts the final node ordering 1620. FIG. 16C depicts the recalculated pair of partitions 1630 (in this case, RDAGs) resulting from recalculation after failure of node c in the input graph 610 of FIG. 6A. The recalculated pair of partitions 1630 includes a primary (or red) partition $\mathbf{1630}_R$ and a secondary (or blue) partition $\mathbf{1630}_B$. It is noted that, in FIG. 16C, the thicker lines denote the links that changed color (illustratively, the links (d,e), (d,b), and (b,a) in primary partition $\mathbf{1630}_R$ and the links (r,a), (a,b), (b,d) and (b,e) in secondary partition $\mathbf{1630}_B$).

Various embodiments depicted and described herein may be used for constructing or modifying an RT-pair. An exemplary embodiment of a method for constructing an RT-pair is depicted and described in FIG. 17.

Figure 17:
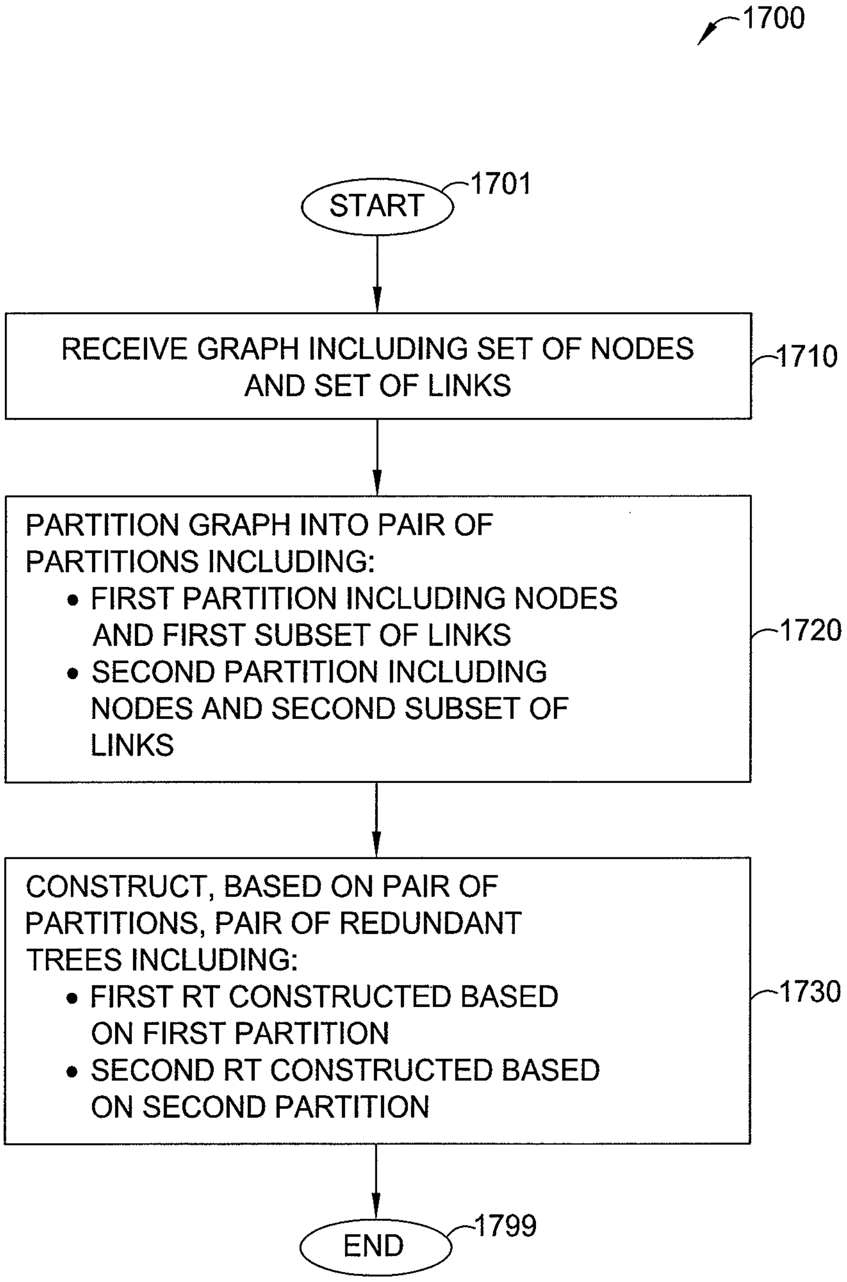
FIG. 17 depicts an embodiment of a method for constructing an RT-pair.

FIG. 17 depicts an embodiment of a method for constructing an RT-pair. It will be appreciated that, although primarily depicted and described as being performed serially, at least some of the steps of method 1700 may be performed contemporaneously or in a different order than depicted in FIG. 17.

At step 1701, method 1700 begins.

At step 1710, a graph is received. The graph represents a topology of at least a portion of a network. The graph includes a set of nodes and a set of links, where the set of nodes includes a multicast source node. The graph may be a directed graph.

At step 1720, the graph is partitioned into a pair of partitions including a first partition and a second partition. The first partition includes each of the nodes of the set of nodes and a first subset of links of the set of links. The second partition includes each of the nodes of the set of nodes and a second subset of links of the set of links. The first and second partitions are redundant directed acyclic graphs (RDAGs). The partitioning of the graph into the first and second partitions may be performed as depicted and described herein with respect to FIGS. 9-11 and 13 (as well as any other figures related to determining first and second partitions from an input graph).

At step 1730, a pair of redundant trees (RTs) is constructed based on the pair of partitions. The pair of RTs includes a first RT and a second RT. The first RT is constructed based on the first partition and the second RT is constructed based on the second partition. The construction of the first RT and the second RT may be performed independent of each other. The construction of the first RT based on the first partition may be performed using any suitable tree construction mechanism and, similarly, the construction of the second RT based on the second partition may be performed using any suitable tree construction mechanism. The construction of the first RT and the second RT may be performed using the same tree construction mechanism for the first and second RTs or using different tree construction mechanisms for the first and second RTs. The first and second RTs may be P2MP trees. The first and second RTs may be VSTs. The first and second RTs may be any other suitable types of redundant trees.

At step 1799, method 1700 ends. It will be appreciated that, although method 1700 is depicted and described as ending (for purposes of clarity), various other functions may be performed based on the pair of RTs (e.g., provisioning the RTs in a network for transport of traffic, modification of the RTs based on topology changes in a network, or the like, as well as various combinations thereof).

Figure 18:
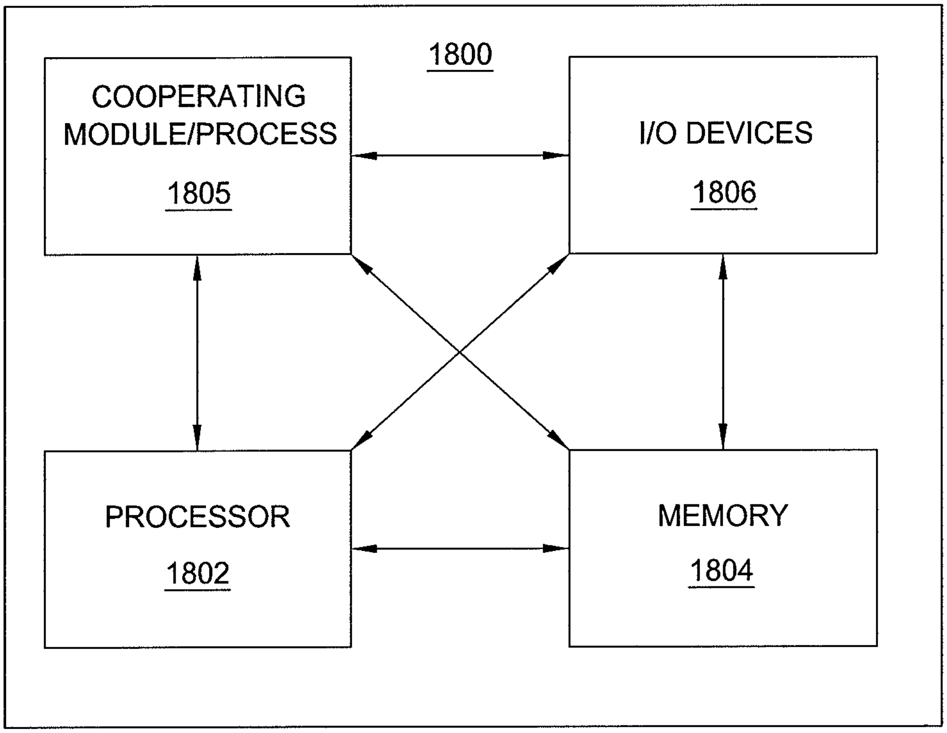
FIG. 18 depicts a high-level block diagram of a computer suitable for use in performing functions described herein.

FIG. 18 depicts a high-level block diagram of a computer suitable for use in performing functions described herein.

The computer 1800 includes a processor 1802 (e.g., a central processing unit (CPU) and/or other suitable processor(s)) and a memory 1804 (e.g., random access memory (RAM), read only memory (ROM), and the like).

The computer 1800 also may include a cooperating module/process 1805. The cooperating process 1805 can be loaded into memory 1804 and executed by the processor 1802 to implement functions as discussed herein and, thus, cooperating process 1805 (including associated data structures) can be stored on a computer readable storage medium, e.g., RAM memory, magnetic or optical drive or diskette, and the like.

The computer 1800 also may include one or more input/output devices 1806 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 1800 depicted in FIG. 18 provides a general architecture and functionality suitable for implementing functional elements described herein and/or portions of functional elements described herein. For example, the computer 1800 provides a general architecture and functionality suitable for implementing a node, a computer configured to perform various functions depicted and described herein, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:

a processor and a memory communicatively connected to the processor, the processor configured to:

receive a graph representing a topology of at least a portion of a network, the graph comprising a set of nodes and a set of links, the set of nodes comprising a multicast source node;

partition the graph into a pair of partitions including a first partition and a second partition, the first partition comprising each of the nodes of the set of nodes and a first subset of links of the set of links, the second partition comprising each of the nodes of the set of nodes and a second subset of links of the set of links; and construct, based on the pair of partitions, a pair of point-to-multipoint (P2MP) trees including a first P2MP tree and a second P2MP tree, the first P2MP tree being constructed based on the first partition and the second P2MP tree being constructed based on the second partition.

2. The apparatus of claim 1, wherein the first partition is a first redundant directed acyclic sub-graph (RDAG) and the second partition is a second RDAG.

3. The apparatus of claim 1, wherein, to construct the pair of P2MP trees, the processor is configured to:

independently construct the first P2MP tree based on the first partition and construct the second P2MP tree based on the second partition.

4. The apparatus of claim 1, wherein, to partition the graph into the pair of partitions, the processor is configured to:

construct a node arrangement for the set of nodes and the set of links; and color the links, based on the node arrangement, to compute the first partition and the second partition.

5. The apparatus of claim 4, wherein, to construct the node arrangement for the set of nodes and the set of links, the processor is configured to:

calculate a directed spanning tree rooted at the multicast source node; and determine, based on the directed spanning tree, a skeleton list indicative of the node arrangement.

6. The apparatus of claim 4, wherein, to construct the node arrangement for the set of nodes and the set of links, the processor is configured to:

calculate a directed spanning tree rooted at the multicast source node;

construct an initial skeleton list include a first node set including the multicast source node, one or more intermediate node sets including one or more outgoing neighbor nodes of the multicast source node in the directed spanning tree, and a last node set including the multicast source node; and construct the node arrangement by performing an iterative skeleton list refinement using the initial skeleton list as an input.

7. The apparatus of claim 6, wherein, to construct the initial skeleton list, the processor is configured to:

for each of the one or more outgoing neighbor nodes of the multicast source node, construct the associated intermediate node set to include each of the nodes in the subtree of the directed spanning tree rooted at the outgoing neighbor node.

8. The apparatus of claim 6, wherein, to construct the node arrangement by performing the iterative skeleton list refinement using the initial skeleton list as an input, the processor is configured to:

at each of one or more iterations:

identify a node set having an associated anchor node and including a non-anchor node having an incoming neighbor node in a different node set;

create a new node set in which the non-anchor node is the anchor node of the new node set;

move, into the new node set, the non-anchor node and any descendents of the non-anchor node in the directed spanning tree; and insert the new node set into the skeleton list between the identified node set and a node set including the non-anchor node.

9. The apparatus of claim 4, wherein, to color the links, the processor is configured to:

for each link in the set of links that is not an outgoing neighbor of the multicast source node, color the link a first color associated with the first partition based on a determination that the link is a first link type or color the link a second color associated with the second partition based on a determination that the link is a second link type; and for each link in the set of links that is an outgoing neighbor of the multicast source node, color the link in a manner tending to ensure that the first partition and the second partition induce two node-disjoint paths to each outgoing neighbor node of the multicast source node.

10. The apparatus of claim 4, wherein, to color the links, the processor is configured to:

for each link in the set of links that is an outgoing neighbor node of the multicast source node:

based on a determination that all incoming non-source neighbor nodes of the outgoing neighbor node appear after the outgoing neighbor node in the node arrangement, color the link a first color associated with the first partition and add the link to the first partition, otherwise color the link a second color associated with the second partition and add the link to the second partition; or based on a determination that the only incoming neighbor of the outgoing neighbor node is the multicast source node, color the link a first color and a second color and add the link to the first partition and the second partition; or otherwise, based on one or more criteria, color the link a first color associated with the first partition and add the link to the first partition or color the link a second color associated with the second partition and add the link to the second partition.

11. The apparatus of claim 4, wherein the processor is configured to:

based on a determination that at least one link in the set of links has not been colored:

color the at least one link in the set of links that has not been colored in a manner tending to ensure that:

for each 2-reachable node in the set of nodes of the first partition, any path from the multicast source node to the 2-reachable node in the first partition is node disjoint from any path from the multicast source node to the 2-reachable node in the second partition; and for each 1-reachable node in the set of nodes of the first partition, any path from the multicast source node to the 1-reachable node in the first partition shares only cut nodes or cut links of the 1-reachable node with a path from the multicast source node to the 1-reachable node in the second partition.

12. The apparatus of claim 4, wherein the node arrangement comprises a skeleton list including a node list having an anchor node that is a cut node for one or more other nodes of the node list, wherein the processor is configured to:

for one or more links from the anchor node to the one or more other nodes of the node list, color each of the one or more links a first color associated with the first partition and a second color associated with the second partition.

13. The apparatus of claim 4, wherein the processor is configured to:

identify one of the links in the set of links as an internal link based on a determination that the one of the links is an incoming link of a node in a node set having an anchor node that is a cut node for the node set; and color the internal link.

14. The apparatus of claim 1, wherein the set of links comprises a cut link, wherein, to partition the graph into the first partition and the second partition, the processor is configured to:

include the cut link within both the first subset of links of the first partition and the second subset of links of the second partition.

15. The apparatus of claim 1, wherein, to construct the pair of P2MP trees, the processor is configured to:

construct the first P2MP tree based on a first tree construction mechanism; and construct the second P2MP tree based on a second tree construction mechanism.

16. The apparatus of claim 15, wherein the first tree construction mechanism and the second tree construction mechanism are different.

17. The apparatus of claim 1, wherein the processor is configured to partition the graph based on a node arrangement, wherein the processor is configured to:

based on addition, to the topology, of a new node having at least two incoming links from at least two neighbor nodes:

insert the new node into a location within the node arrangement; and color the at least two incoming links based on the location of the new node within the node arrangement.

18. The apparatus of claim 1, wherein the processor is configured to:

based on addition, to the topology, of a new node having a single incoming link from a neighbor node:

insert the new node into the first partition and color the incoming link a first color associated with the first partition; and insert the new node into the second partition and color the incoming link a second color associated with the second partition.

19. The apparatus of claim 1, wherein the processor is configured to partition the graph based on a node arrangement comprising a plurality of node sets, wherein the processor is configured to:

based on addition, to the topology, of a new node having a single incoming link from a neighbor node:

insert the new node into one of the node sets including the neighbor node.

20. The apparatus of claim 1, wherein the topology includes a cut element, wherein the processor is configured to partition the graph based on a node arrangement comprising a skeleton list including a plurality of node sets, wherein the processor is configured to:

based on addition, to the topology, of a new node such that a particular node has a new incoming link:

modify the skeleton list by assign a sub-tree of a directed spanning tree rooted at the multicast source node to one of the node sets having an anchor node that is the closest cut node of particular node having the new incoming link; and modify the node arrangement by performing an iterative skeleton list refinement using the modified skeleton list as an input.

21. The apparatus of claim 1, wherein the processor is configured to:

based on removal of one or more elements from the topology:

identify one or more affected nodes affected by the removal of the one or more elements from the topology; and modify at least one of the first partition and second partition based on the one or more affected nodes.

22. The apparatus of claim 1, wherein the processor is configured to partition the graph based on a node arrangement comprising a skeleton list having a plurality of node sets, wherein the processor is configured to:

based on removal of one or more elements from the topology:

identify one or more affected nodes affected by the removal of the one or more elements from the topology; and modify the node arrangement based on the one or more affected nodes.

23. A method, comprising:

using a processor and a memory for:

receiving a graph representing a topology of at least a portion of a network, the graph comprising a set of nodes and a set of links, the set of nodes comprising a multicast source node;

partitioning the graph into a pair of partitions including a first partition and a second partition, the first partition comprising each of the nodes of the set of nodes and a first subset of links of the set of links, the second partition comprising each of the nodes of the set of nodes and a second subset of links of the set of links; and constructing, based on the pair of partitions, a pair of point-to-multipoint (P2MP) trees including a first P2MP tree and a second P2MP tree, the first P2MP tree being constructed based on the first partition and the second P2MP tree being constructed based on the second partition.

24. A non-transitory computer-readable storage medium storing instructions which, when executed by a computer, cause the computer to perform a method, the method comprising:

receiving a graph representing a topology of at least a portion of a network, the graph comprising a set of nodes and a set of links, the set of nodes comprising a multicast source node;

partitioning the graph into a pair of partitions including a first partition and a second partition, the first partition comprising each of the nodes of the set of nodes and a first subset of links of the set of links, the second partition comprising each of the nodes of the set of nodes and a second subset of links of the set of links; and constructing, based on the pair of partitions, a pair of point-to-multipoint (P2MP) trees including a first P2MP tree and a second P2MP tree, the first P2MP tree being constructed based on the first partition and the second P2MP tree being constructed based on the second partition.

* * * * *